US012035439B2

(12) United States Patent
Choi et al.

(10) Patent No.: US 12,035,439 B2
(45) Date of Patent: Jul. 9, 2024

(54) PERFORMANCE DIRECTING SYSTEM, DEVICE, AND METHOD USING PLURALITY OF LAYERS

(71) Applicant: FANLIGHT CO., LTD., Seoul (KR)

(72) Inventors: Kyung Il Choi, Seoul (KR); Jung Min Choi, Seoul (KR); Hyun Gil Kim, Seoul (KR)

(73) Assignee: FANLIGHT CO., LTD., Seoul (KR)

(*) Notice: Subject to any disclaimer, the term of this patent is extended or adjusted under 35 U.S.C. 154(b) by 171 days.

(21) Appl. No.: 17/736,640

(22) Filed: May 4, 2022

(65) Prior Publication Data

US 2022/0264727 A1 Aug. 18, 2022

Related U.S. Application Data

(63) Continuation of application No. PCT/KR2021/005829, filed on May 10, 2021.

(30) Foreign Application Priority Data

Feb. 10, 2021 (KR) .................. 10-2021-0018934

(51) Int. Cl.
H05B 47/155 (2020.01)
A63J 5/02 (2006.01)
H05B 47/19 (2020.01)

(52) U.S. Cl.
CPC .............. H05B 47/155 (2020.01); A63J 5/02 (2013.01); H05B 47/19 (2020.01)

(58) Field of Classification Search
CPC ...... H05B 47/155; H05B 47/19; H05B 47/10; A63J 5/02; Y02B 20/40; F21V 23/0435

USPC ......................................... 315/294
See application file for complete search history.

(56) References Cited

U.S. PATENT DOCUMENTS

| 7,697,925 B1* | 4/2010 | Wilson | H04M 1/22 455/418 |
| 2006/0022214 A1* | 2/2006 | Morgan | H05B 45/40 257/E25.032 |
| 2018/0084626 A1* | 3/2018 | Song | H05B 47/155 |
| 2021/0059034 A1* | 2/2021 | Song | F21S 10/02 |
| 2021/0076472 A1* | 3/2021 | Kim | H05B 47/16 |

(Continued)

FOREIGN PATENT DOCUMENTS

| JP | 2020-156994 A | 10/2020 | |
| KR | 10-2015-0055938 A | 5/2015 | |
| KR | 20190034182 A * | 3/2019 | ............. Y02B 20/40 |

(Continued)

OTHER PUBLICATIONS

International Search Report issued in PCT/KR2021/005829; mailed Oct. 21, 2021.

(Continued)

Primary Examiner — Ryan Jager
(74) Attorney, Agent, or Firm — Studebaker & Brackett PC

(57) ABSTRACT

Disclosed is a performance directing system by using a plurality of layers including a control console device generating and transmitting a data packet including direction information for each of the plurality of layers and a plurality of light emitting devices, each of which receives the data packet from the control console device and each of which emits light based on the direction information included in the data packet.

16 Claims, 31 Drawing Sheets

(56) References Cited

U.S. PATENT DOCUMENTS

2023/0201738 A1\* 6/2023 Choi ..................... A63H 37/00
                                                                472/61

FOREIGN PATENT DOCUMENTS

| KR | 10-2019-0034182 A | 4/2019 |
| KR | 10-2019-0070220 A | 6/2019 |
| KR | 10-2020-0123735 A | 10/2020 |
| KR | 10-2021-0035105 A | 3/2021 |

OTHER PUBLICATIONS

An Office Action mailed by the Japanese Patent Office on Aug. 1, 2023, which corresponds to Japanese Patent Application No. 2022-529738 and is related to U.S. Appl. No. 17/736,640; with English language translation.

\* cited by examiner

FIG.7

| First direction information number | Emission color information ||||  Direction information of first layer ||||||||| 
|---|---|---|---|---|---|---|---|---|---|---|---|
| | | | | | First masking information |||| First transparency information ||||
| | CF1 | CF2 | CF3 | CF4 | CF1 | CF2 | CF3 | CF4 | CF1 | CF2 | CF3 | CF4 |
| Number 1 | Red | Yellow | Blue | White | 1 | 1 | 0 | 0 | 25% | 50% | 60% | 15% |

410

CF1: Classification1
CF2: Classification2
CF3: Classification3
CF4: Classification4

FIG. 8

| Direction information of second layer | | | | | | | | |
|---|---|---|---|---|---|---|---|---|
| Second direction information number | Second masking information | | | | Second transparency information | | | |
| | CF1 | CF2 | CF3 | CF4 | CF1 | CF2 | CF3 | CF4 |
| Number 4 | 1 | 1 | 1 | 0 | 50% | 10% | 30% | 15% |

420

CF1: Classification1

CF2: Classification2

CF3: Classification3

CF4: Classification4

FIG. 10

| No. | First direction scene of first layer | | | | Second direction scene of second layer | | | |
|---|---|---|---|---|---|---|---|---|
| | Emission classification | Masking classification | Transparency classification | | No. | Emission color | Masking classification | Transparency classification |
| 1 | 1 | 4 | 1 | | 1 | Red | 1 | 1 |
| 2 | 4 | 3 | 3 | | 2 | White | 1 | 3 |
| 3 | 3 | 1 | 2 | | 3 | Yellow | 2 | 4 |
| 4 | 2 | 3 | 2 | | 4 | Sky blue | 3 | 2 |
| 5 | 1 | 2 | 4 | | 5 | Green | 4 | 1 |
| ... | ... | ... | ... | | ... | ... | ... | ... |

<Condition information of emitting light device A>

| Change information of top layer ||
|---|---|
| First direction scene number | Change information |
| Number 1 | 1 or 0 |

FIG. 13B

| Change information of top layer |||||
|---|---|---|---|---|
| First direction scene number | Change information ||||
| | CF1 | CF2 | CF3 | CF4 |
| Number 1 | 1 | 0 | 1 | 1 |

440

CF1: Classification1
CF2: Classification2
CF3: Classification3
CF4: Classification4

FIG. 14

| | First direction scene number 1 | | | Second direction scene number 4 | | | |
|---|---|---|---|---|---|---|---|
| | First emission color value | First masking value | First transparency value | Second emission color value | Second masking value | Second transparency value |
| ELD A | Red | 0 | 25% | Sky blue | 1 | 10% |
| ELD B | Yellow | 0 | 15% | Blue | 0 | 15% |
| ELD C | Yellow | 1 | 50% | Green | 0 | 30% |
| ELD D | Red | 0 | 70% | Violet | 0 | 15% |

ELD A: emitting light device A
ELD B: emitting light device B
ELD C: emitting light device C
ELD D: emitting light device D

PERFORMANCE DIRECTING SYSTEM, DEVICE, AND METHOD USING PLURALITY OF LAYERS

CROSS-REFERENCE TO RELATED APPLICATIONS

The present application is a continuation of International Patent Application No. PCT/KR2021/005829, filed on May 10, 2021, which is based upon and claims the benefit of priority to Korean Patent Application No. 10-2021-0018934 filed on Feb. 10, 2021. The disclosures of the above-listed applications are hereby incorporated by reference herein in their entirety.

BACKGROUND

Embodiments of the inventive concept described herein relate to a performance directing system, device, and method for controlling the emission of a light emitting device in a performance hall by using a plurality of layers.

In general, a light emitting device (or a lighting device) refers to a light emitting device that achieves the purpose of lighting by reflecting, refracting, and transmitting light from a light source. Light emitting devices may be classified into an indirect light emitting device, a semi-indirect light emitting device, a full-diffusion light emitting device, a semi-direct light emitting device, and a direct light emitting device depending on light distribution.

With developments of technologies, the light emitting device is being used for various purposes. For example, the light emitting device is used to direct a media faŋade. The media faŋade refers to the implementation of media functions by installing light emitting devices on exterior walls of a building.

As another example, light emitting devices are sometimes used as small cheering tools in a sports stadium or concert hall in an illumination environment of a specific level or less. However, because a plurality of lighting devices is individually controlled in such the environment, it is difficult to create a systematic lighting pattern or shape.

In the meantime, for a performance hall such as sports events or concerts, audiences expect a new direction every time. Because most of the seats in the performance hall are filled with seats, it is difficult to direct a media faŋade by using a light emitting device in another space.

Accordingly, to specifically solve the above problems, there is a need for a method capable of collectively controlling a plurality of light emitting devices and directing various performances in a performance hall such as a sports stadium or concert hall through this control.

SUMMARY

Embodiments of the inventive concept provide a performance directing system, device, and method using a plurality of layers.

Problems to be solved by the inventive concept are not limited to the problems mentioned above, and other problems not mentioned will be clearly understood by those skilled in the art from the following description.

According to an embodiment, a performance directing system by using a plurality of layers includes a control console device that generates and transmits a data packet including direction information for each of the plurality of layers and a plurality of light emitting devices, each of which receives the data packet from the control console device and each of which emits light based on the direction information included in the data packet. The plurality of layers includes a first layer being an uppermost layer, a second layer being an intermediate layer, and a third layer being a lowermost layer. Each of the plurality of light emitting devices determines a priority between the first layer being the uppermost layer and the second layer being the intermediate layer based on direction information of the first layer, performs a calculation for determining an emission color by using at least one of the direction information of the first layer, direction information of the second layer, and direction information of the third layer depending on the priority determination, and emits the light based on the calculated result.

In an embodiment of the inventive concept, each of the plurality of light emitting devices may perform a first calculation by using the direction information of the second layer and the direction information of the third layer and perform a second calculation by using the first calculated result and the direction information of the first layer, and emit light based on the second calculated result when the first layer being the uppermost layer has priority over the second layer being the intermediate layer, depending on the priority determination, and may perform the first calculation by using the direction information of the first layer and the direction information of the third layer, perform the second calculation by using the first calculated result and the direction information of the second layer, and emit light based on the second calculated result when the second layer being the intermediate layer has priority over the first layer being the uppermost layer, depending on the priority determination.

In an embodiment of the inventive concept, the direction information of the first layer may include number information corresponding to a first direction scene, emission color information, first masking information, and first transparency information. The direction information of the second layer may include number information corresponding to a second direction scene, second masking information, and second transparency information. The direction information of the third layer may include background color information.

In an embodiment of the inventive concept, condition information different from each other may be stored in each of the plurality of light emitting devices. Each of the plurality of light emitting devices may identify a first emission color value, a first masking value, and a first transparency value at the first direction scene corresponding to the condition information by using the direction information of the first layer, may identify a second emission color value, a second masking value, and a second transparency value at the second direction scene corresponding to the condition information by using the direction information of the second layer, and may identify a background color value by using the direction information of the third layer.

In an embodiment of the inventive concept, each of the plurality of light emitting devices may determine the priority based on the first masking value, when the first layer being the uppermost layer has priority over the second layer being the intermediate layer depending on the priority determination, when performing the first calculation, may perform alpha blending of the second emission color value and the background color value based on the second transparency information, and when performing the second calculation, may perform alpha blending of the first calculated result and the first emission color value based on the first transparency information.

In an embodiment of the inventive concept, each of the plurality of light emitting devices, may determine the priority based on the first masking value, when the second layer being the intermediate layer has priority over the first layer being the uppermost layer depending on the priority determination, when performing the first calculation, may perform alpha blending of the first emission color value and the background color value based on the first transparency information, and when performing the second calculation, may perform alpha blending of the first calculated result and the second emission color value based on the second transparency information.

In an embodiment of the inventive concept, the data packet may further include top layer change information. Each of the plurality of light emitting devices may change the second layer to an uppermost layer and change the first layer to an intermediate layer depending on the top layer change information, and may determine a priority between the second layer being the uppermost layer and the first layer being the intermediate layer based on the second masking value.

According to an embodiment, a performance directing method by using a plurality of layers and by using a control console device and a plurality of light emitting devices includes generating and transmitting, by the control console device, a data packet including direction information for each of the plurality of layers and receiving, by each of a plurality of light emitting devices, the data packet from the control console device and emitting light based on the direction information included in the data packet. The plurality of layers includes a first layer being an uppermost layer, a second layer being an intermediate layer, and a third layer being a lowermost layer. The emitting of the light includes determining a priority between the first layer being the uppermost layer and the second layer being the intermediate layer based on direction information of the first layer, performing a calculation for determining an emission color by using at least one of the direction information of the first layer, direction information of the second layer, and direction information of the third layer depending on the priority determination, and emitting the light based on the calculated result.

According to an embodiment, a control console device for performance direction includes a communication unit communicates with a light emitting device, a memory storing data, and a processor generating data packet for an emission operation of the light emitting device. The data packet includes direction information about each of a plurality of layers.

According to an embodiment, a light emitting device for performance direction includes a communication unit communicating with a control console device, a light emitting unit emitting light by using a light source element, a memory storing data, and a processor controlling an operation of the light emitting device. The processor may perform a calculation for determining an emission color by using direction information about each of a plurality of layers included in a data packet received from the control console device through the communication unit, based on condition information stored in the memory and may control emission based on the calculated result.

In an embodiment of the inventive concept, the condition information may be information transmitted through an application installed on a smart device possessed by a user. The application may map the condition information based on seat information included in purchase information of a ticket transmitted to the smart device of the user and may provide the mapped result to the light emitting device.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 7 is an exemplary diagram for describing direction information of a first layer included in the data packet of FIG. 6;

FIG. 8 is an exemplary diagram for describing direction information of a second layer included in the data packet of FIG. 6;

FIG. 10 is an exemplary diagram for describing condition information of a light emitting device, according to an embodiment of the inventive concept;

FIGS. 13A and 13B are exemplary views for describing top layer change information of FIG. 12;

FIG. 14 is an exemplary view for describing an emission color value, a masking value, and a transparency value for each layer corresponding to condition information of each of a plurality of light emitting devices, according to an embodiment of the inventive concept;

DETAILED DESCRIPTION

Figure 1:
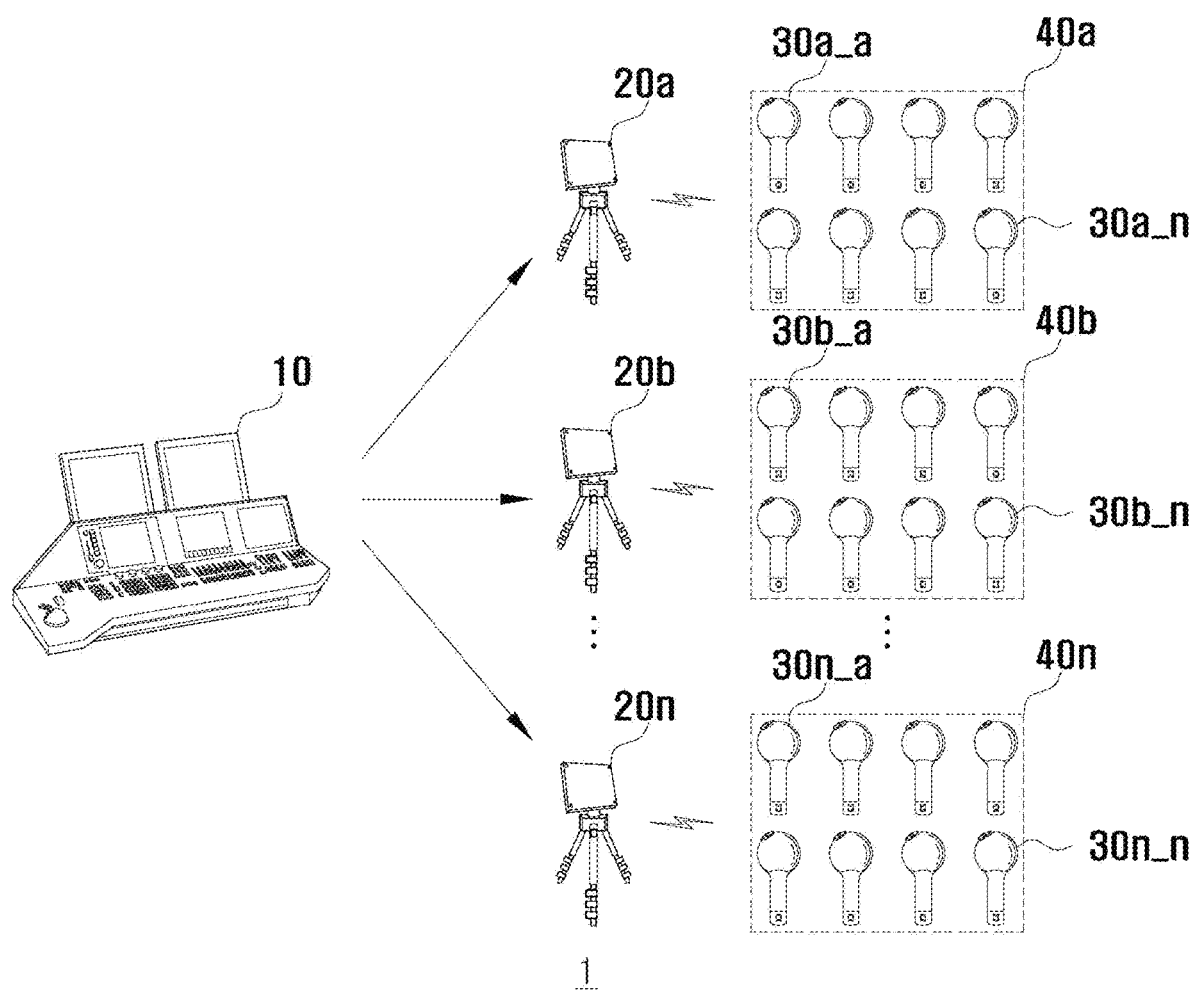
FIG. 1 is a diagram schematically illustrating a configuration of a system for directing a performance in a performance hall, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

A word "exemplary" is used herein in the sense of "being used as an example or illustration". An embodiment described herein as "exemplary" is not necessarily to be construed as preferred or advantageous over other embodiments.

The term "unit" used herein may refer to software or hardware such as field programmable gate array (FPGA) or application specific integrated circuit (ASIC), and the "unit" may perform some functions. However, the "unit" may be not limited to software or hardware. The "unit" may be configured to exist in an addressable storage medium or may be configured to play one or more processors. Therefore, as an example, "units" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" and elements may be combined into a smaller number of "units" and elements or may be divided into additional "units" and elements.

Moreover, in this specification, all "units" may be controlled by at least one processor, and at least one processor may perform operations performed by the "units" of the inventive concept.

Embodiments of the present specification may be described in terms of a function or a block performing a function. A block capable of being referred to as a 'unit' or a 'module' of the inventive concept is physically implemented by analog or digital circuits such as logic gates, integrated circuits, microprocessors, microcontrollers, memories, passive electronic components, active electronic components, optical components, hardwired circuits, and the like and may be selectively driven by firmware and software.

Embodiments of the present specification may be implemented by using at least one software program running on at least one hardware device and may perform a network management function of controlling an element.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

As illustrated in the figures, spatially relative terms, such as "below", "beneath", "lower", "above", "upper", and the like, may be used herein for ease of description to describe the relationship between one component and other components. It will be understood that the spatially relative terms are intended to encompass different orientations of the components in use or operation in addition to the orientation depicted in the figures. For example, when inverting a component shown in the figures, a component described as "below" or "beneath" of another component may be placed "above" another element. Thus, the exemplary term "below" may include both downward and upward directions. The components may also be oriented in different directions, and thus the spatially relative terms may be interpreted depending on orientation.

Hereinafter, embodiments of the inventive concept will be described in detail with reference to accompanying drawings.

FIG. 1 is a diagram schematically illustrating a configuration of a system for directing a performance in a performance hall, according to an embodiment of the inventive concept.

Referring to FIG. 1, according to an embodiment of the inventive concept, a system 1 (hereinafter referred to as a "performance directing system") for directing a performance in a performance hall may include a control console device 10, a transmitter (20a, 20b, 20n-hereinafter referred to as "20") and a light emitting device (30a_a, 30a_n, 30b_a, 30b_n, 30n_a, 30n_n, hereinafter referred to as "30"). Here, the performance hall may refer to a performance hall such as a sports stadium or concert hall, and may mean a place where performances such as actual sports events or concerts are demonstrated. Herein, the performance directing system 1 may include fewer or more components than the components illustrated in FIG. 1.

In detail, the performance directing system 1 may include the control console device 10 that generates and transmits a data packet for an emission operation for each performance scene, the transmitter 20 that transmits the data packet received from the control console device 10 to the light emitting device 30, and the plurality of light emitting devices 30 that receives the data packet generated from the control console device 10 through the transmitter 20 and performs an operation for emission in the data packet.

The performance directing system 1 may direct various types of light emission patterns for performance direction such as cheering in audience seats in the performance hall as the control console device 10 controls an emission state of the light emitting device 30.

Moreover, when a performance is directed in a performance hall, the performance directing system 1 may change the emission state of the light emitting device 30 in real time by providing data packets from the control console device 10 to the light emitting device 30 in real time, thereby easily providing various direction scenes depending on situations.

In the inventive concept, the control console device 120 may perform a function of controlling the light emitting device 30 for performance direction in the performance hall. For example, the control console device 10 may be one of electronic devices such as a mobile phone, a smart phone, a laptop computer, a digital broadcasting terminal, a personal digital assistant (PDA), a portable multimedia player (PMP), a navigation system, a slate PC, a tablet PC, an ultrabook, and a wearable device, for example, a watch-type terminal (e.g., a smart watch), a glass-type terminal (e.g., a smart glass), a head mounted display (HMD), or the like. The control console device 100 may include all electronic devices capable of installing and executing an application related to an embodiment or may include some of configurations of the electronic device or may be implemented in various forms capable of interworking therewith.

Furthermore, the control console device 10 may be one of software for PC and an electronic device such as MA Lighting grandMA2, grandMA3, ETC EOS, ETC ION, ETC GIO, Chroma Q Vista, High End HOG, High End Fullboar, Avolites Sapphire Avolites Tiger, Chamsys MagicQ, Obsidian control systems Onyx, Martin M6, Martin M1, Nicolaudie Sunlite, ESA, ESA2, Lumidesk, SunSuite, Arcolis, Daslight, LightRider, MADRIX, DJ LIGHT STUDIO, DISCO-DESIGNER VJ STUDIO, Stagecraft, Lightkey, or the like.

Furthermore, the control console device 10 includes appropriate software or a computer program for controlling the light emitting device 30. For example, an exemplary protocol for controlling the light emitting device 30 may include DMX512 or Art-Net, sACN, ETC-Net2, Pathport, Shownet, KiNET, or the like. The control console device 10 may transmit a data signal (e.g., a data packet) in an appropriate format such as DMX512 or Art-Net, sACN, ETC-Net2, Pathport, Shownet or KiNET. The control console device 10 may generate a data packet for controlling the light emitting device 30 and may transmit the data packet to the light emitting device 30.

Moreover, the data packet generated by the control console device 10 may be received by a master device (not shown) and may be converted into a wireless signal. Also, the master device (not illustrated) may deliver the data packet converted into the wireless signal to the transmitter 20. The transmitter 20 may transmit the data packet to the light emitting device 30 in a performance hall by using wireless communication (e.g., RF communication, or the like). Here, the wireless signal may be generated by converting control data into a signal in a format for controlling the light emitting device 30 in a wireless communication method.

According to an embodiment, the master device (not illustrated) may be omitted. That is, the control console device 10 may directly deliver the data packet to the transmitter 20, and then the transmitter 20 may convert the data packet into a wireless signal and may transmit the wireless signal to the light emitting device 30.

Moreover, the control console device 10 may include a plurality of input/output ports. The control console device 10 may have an input/output port corresponding to or related to a specific data signal format or protocol. For example, the control console device 10 may have a first port dedicated to RDM and DMX512 data input/output and a second port dedicated to Art-Net and sACN, ETC-Net2, Pathport, Shownet, KiNET data input/output.

The DMX512 and RDM, Art-Net, sACN, ETC-Net2, Pathport, Shownet, and KiNET protocols are widely known as control protocols for stage lighting installations. According to embodiments of the inventive concept, flexible control planning for the light emitting device 30 is possible by using control protocols such as DMX512 or RDM, Art-Net, sACN, ETC-Net2, Pathport, Shownet, and KiNET.

Besides, the control console device 10 may receive and store performance direction data from another device (e.g., the data generation device) in advance or may receive the performance direction data through other storage or transmission media. Furthermore, the control console device 10 may receive the performance direction data in real time during a performance and may generate a data packet corresponding to the performance direction data.

Here, the performance direction data may include information about all direction scenes directed during a performance time depending on the seating arrangement of a performance. In detail, the performance direction data may include information about group control, picture control, and pixel control for each direction scene.

The performance direction data may include control information for each direction scene directed during a performance time. In detail, the performance direction data may include information about group control, picture control, and pixel control for each direction scene. Descriptions about the group control, the picture control, and the pixel control will be described later.

In an embodiment of the inventive concept, the transmitter 20 may be a communication device such as an antenna, and may transmit the data packet received from the control console device 10 to the light emitting device 30. The transmitter 20 may receive a data packet for controlling emission of the light emitting device 30 from the control console device 10 and may transmit the data packet to the light emitting device 30.

It is disclosed that the transmitter 20 is a separate device from the control console device 10. However, the control console device 10 may include a communication module performing the same role as the transmitter 20. Accordingly, when including the communication module, the control console device 10 may perform the same role as the transmitter 20. The light emitting device 30 may receive the data packet from the control console device 10 and then may emit light.

Here, the transmitter 20 may have directivity. The performance planner may place the transmitter 20 in consideration of the specification of a transmitter used in the corresponding performance at a step of planning a performance. However, because the light emitting devices 30 located in some seats may receive all the data packets (a portion overlapping the coverage of a transmitter) transmitted from the different transmitter 20 due to physical limitations, it may be difficult for the light emitting devices 30 to determine a data packet corresponding to the emission. However, according to embodiments of the inventive concept, the light emitting device 30 may correctly determine the data packet corresponding to the light emitting device 30 within a limited wireless bandwidth. The light emitting device 30 may receive the data packet based on the identification information of the transmitter 20. Moreover, the control console device 10 transmits the data packet to the transmitter 20, thereby lowering the effect on noise. Accordingly, it is possible to obtain a performance directing effect different from that of the existing performance.

Besides, the transmitter 20 may repeatedly transmit the data packet to the light emitting device 30 as much as the predetermined number of times. In general, a signal that the transmitter 20 transmits (broadcasts) is mostly one-time. However, a lot of signals having different bandwidths are present in a performance hall. Accordingly, a signal other than the data packet may become noise during performance direction. The noise may prevent the data packet from being transmitted correctly to the light emitting device 30. Accordingly, the transmitter 20 transmits the data packet to the light emitting device 30 as much as the predetermined number of times (e.g., 5 times per one data packet) such that the light emitting device 30 properly receives the data packet.

In an embodiment of the inventive concept, under the control of the control console device 10, the light emitting device 30 may perform a function of directing various types of performance directing effects in real time or depending on the predetermined data packet.

Here, the light emitting device 30 may be a device including any electronic device that includes a light emitting element/device such as an LCD or LED or is connected to a light emitting element/device and is capable of wireless communication. The light emitting device 300 may be a small cheering tool carried by audiences in a performance hall such as an athletic stadium or a concert. As an embodiment, the light emitting device 30 may correspond to a mobile phone, a wireless light stick, a lighting stick, a lighting bar, a lighting ball, and a structure attached with a light source that is wirelessly controllable. Moreover, the light emitting device 30 may be referred to as a lighting device, a receiver, a controlled device, a slave, or a slave lighting device. Also, the light emitting device 30 may include a wearable device capable of being worn on a part of the body such as a wrist or chest.

On the basis of identification information of the transmitter 20 thus previously stored, the light emitting device 30 may interpret the data packet received from the transmitter 20 and may emit light. In detail, the light emitting device 30 may compare the pre-stored identification information of the transmitter 20 with identification information of the transmitter 20 included in the data packet. When the pre-stored identification information of the transmitter 20 is the same as identification information of the transmitter 20 included in the data packet, the light emitting device 30 may emit light to correspond to an emission pattern included in the corresponding data packet.

As shown in FIG. 1, the light emitting devices (30a_a, 30a_n) included in a set 40a may emit light to correspond to an emission pattern included in the data packet received from a transmitter 20a; the light emitting devices (30b_a, 30b_n) included in a set 40b may emit light to correspond to an emission pattern included in the data packet received from a transmitter 20b; and, the light emitting devices (30n_a, 30n_n) included in a set 40n may emit light to correspond to an emission pattern included in the data packet received from a transmitter 20n. Here, the sets (40a, 40b, 40n, hereinafter referred to as "40") may refer to a set of light emitting devices 30 having the same identification information of the transmitter 20. The number of light emitting devices 30 included in each of the sets 40 may be different for each set. Assuming that the light emitting device 30 is positioned in a seat, the set 40 may be divided for each zone and region based on seat information of the performance hall, depending on the performance planner's intent. Accordingly, the set 40 may correspond to information indicating zone A, zone B, or the like, which is the greatest unit of seat information marked on each seat. In addition, the performance planner may divide a control area into detailed sets within one zone and may control the light emitting device 30 included in different detailed sets through a different transmitter 20.

As described above, the transmitter 20 may have directivity. In a performance planning stage, the performance planner may place the transmitter 20 in consideration of the specification of a transmitter used in the corresponding performance. Accordingly, the light emitting device 30 may receive the data packet from the transmitter 20 having identification information corresponding to pre-stored identification information of the transmitter 20.

As described above, the transmitter 20 may repeatedly transmit a data packet to the light emitting device 300 as much as the predetermined number of times. In this case, the light emitting device 30 may receive the same data packet multiple times to perform a redundant emission operation. To prevent the redundant emission operation, each data packet may include a Frame Sequence Number (FSN). The FSN may serve to inform the light emitting device 30 of the order of transmitted data (in detail, a data packet indicating an emission pattern). For example, whenever a direction scene is changed, the FSN may have a value that increases by 1. When the light emitting device 30 receives the data packet having the same FSN as the previously received data packet, the corresponding light emitting device 30 may ignore the corresponding data packet by determining that the corresponding data packet is the already received data packet.

Figure 2:
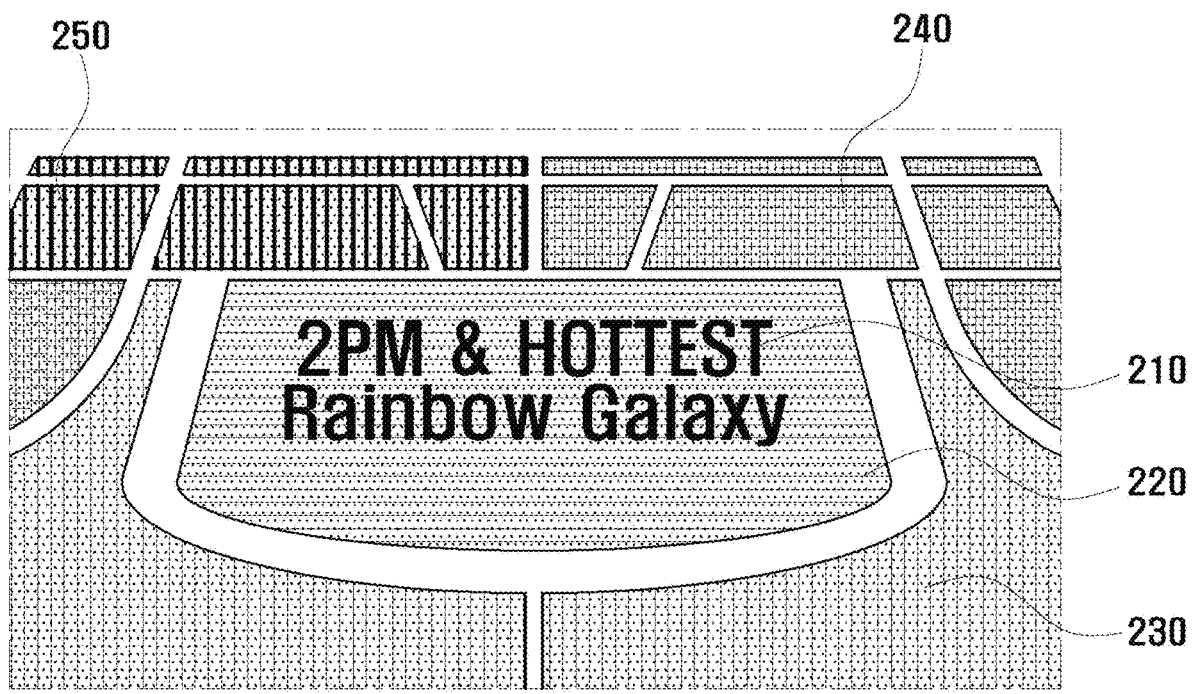
FIG. 2 is an exemplary view illustrating a performance directing effect directed on an audience seat of a performance hall, according to an embodiment of the inventive concept.

FIG. 2 is an exemplary view illustrating a performance directing effect directed on an audience seat of a performance hall, according to an embodiment of the inventive concept.

To implement performance directing effects by using the light emitting device 30 positioned to correspond to each seat in a performance hall, the performance directing system 10 may generate a data packet.

At this time, the data packet may be generated by the control console device 10 or may be generated by a separate device (e.g., a data generation device or an external server) and provided to the control console device 10. For convenience of description, it will be described below that the control console device 10 generates the data packet.

As described above, the control console device 10 may receive and store performance direction data from another device (e.g., the data generation device) in advance or may receive the performance direction data through other storage or transmission media. Furthermore, the control console device 10 may receive the performance direction data in real time during a performance and may generate a data packet corresponding to the performance direction data.

A data generation device (not illustrated) may generate a direction scene to be directed by using the light emitting device 30 during a performance time in a performance hall. At this time, the data generation device may organize the direction scene for each performance direction section depending on the direction scene. For example, a direction scene (e.g., a first scene) may be generated in a first performance direction section (e.g., a first time). Another direction scene (e.g., a second scene) may be generated in a second performance direction section (e.g., a second time). As illustrated in FIG. 2, when audience seats in the performance hall are organized, a direction scene (a first scene) displayed with a different emission color for each audience seat may be generated in the first performance direction section together with a specific text as illustrated in FIG. 2. Moreover, a second direction scene, which is different from the first direction scene, such as a specific figure or pattern may be generated in the second performance direction section.

According to an embodiment of the inventive concept, when the light emitting device 30 is controlled for each group, the data generation device (not illustrated) may group audience seats in the performance hall into a plurality of groups based on each direction scene generated for each performance direction section and then may generate group information about the plurality of groups. For example, when there are a plurality of group units capable of being grouped in a similar or identical light emission shape in the direction scene (the first scene) to be directed in the first performance direction section, the data generation device may divide audience seats in the performance hall into a plurality of areas to correspond to a group unit and may generate the divided areas as each group. In other words, the direction scene (the first scene) of the first performance direction section may include the plurality of groups.

Referring to FIG. 2, the data generation device may designate audience seats marked with a specific text to a first group 210, may identify seats to be directed in the same emission color within the audience seats, and may designate the seats to second to fifth groups 220, 230, 240, and 250.

The group control may be a control method for controlling all light emitting devices emitting light with the same emission color in one group. However, the group control method described in FIG. 2 is only an example for controlling the light emitting device 30. The data packet does not need to be limited to only a signal for group control. For example, the data packet according to an embodiment of the inventive concept may include a control signal for picture control or a control signal for pixel control.

In addition, the data packet may include not only a signal for a specific type of control, but also a plurality of signals for control. For example, the data packet may include a signal for group control and a signal for picture control.

On the basis of an emission color that each of the light emitting device 30 stores in advance for each direction scene, the picture control may be a control method for emitting light for each direction scene when the data packet is received. For example, to emit red light at a specific performance direction scene (the first scene) and to emit green light at another performance direction scene (the second scene), a specific light emitting device may store values of red, green, blue, white, amber, or the like corresponding to a emission and control device in advance for each scene.

In group control, the light emitting device 30 stores information about a group, to which the light emitting device 30 belongs, for each scene. On the other hand, in picture control, the light emitting device 300 stores an emission color for each scene.

Furthermore, similarly to the group control, in pixel control, the light emitting device 30 may store information associated with a pixel to which the light emitting device 300 belongs. Here, a pixel may include at least one continuous seat. Accordingly, in group control, the light emitting device 30 positioned in a seat that is not continuous may be controlled with the same color. On the other hand, in pixel control, the light emitting device 30 positioned in a seat thus continuous may be controlled with the same color.

Returning to FIG. 2, the control console device 10 may transmit a data packet based on at least one of group control, pixel control, and picture control. The light emitting device 30 may receive the data packet and may emit light such that a text is displayed in a performance hall, as illustrated in FIG. 2, or various directing effects are realized. The above-described operation of the data generation device may be performed by the control console device 10.

Figure 3:
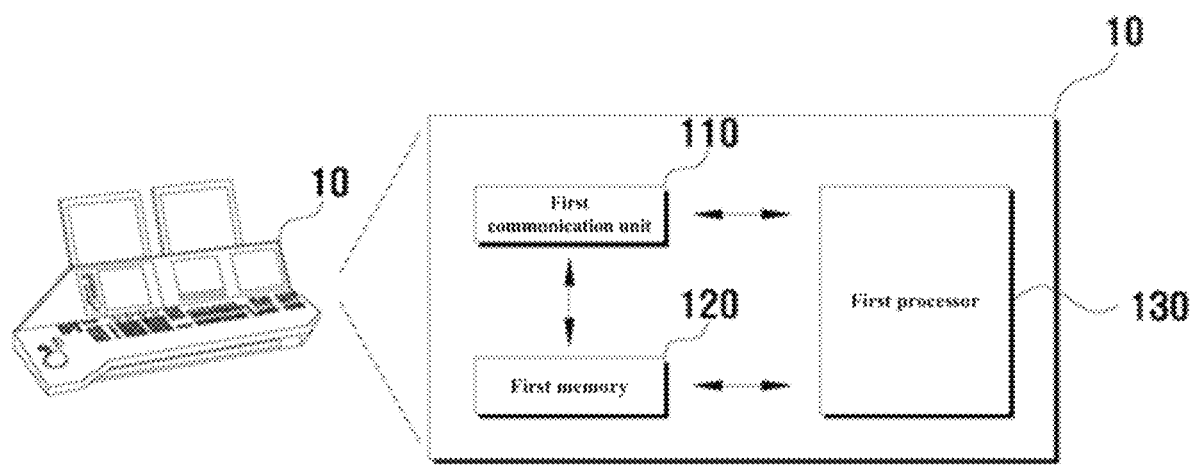
FIG. 3 is a block diagram illustrating a configuration of a control console device, according to an embodiment of the inventive concept.

FIG. 3 is a block diagram illustrating a configuration of a control console device, according to an embodiment of the inventive concept.

Referring to FIG. 3, the control console device 10 may include a first communication unit 110, a first memory 120, and a first processor 130. The components shown in FIG. 3 are not essential in implementing the control console device 10. The control console device 10 described herein may have more or fewer components than those listed above.

In more detail, the first communication unit 110 may include one or more modules that enable wired or wireless communication with the transmitter 20, a wireless communication terminal (e.g., a smartphone) (not shown) carried by an audience, the light emitting device 30, or a data generation device (not shown). Furthermore, the first communication unit 110 may include one or more modules connecting the control console device 10 to one or more networks.

The first memory 120 may include a cache, a buffer, or the like. The first memory 120 may store data received or generated from the first processor 130 or the data generation device (not illustrated). In an embodiment, the first memory 120 may store performance direction data generated by the data generation device (not illustrated).

On the basis of the performance direction data stored in the first memory 120, the first processor 130 may generate the data packet corresponding to a direction scene of each scene in the corresponding performance direction section and may transmit the generated data packet to the transmitter 20. Alternatively, the first processor 130 may transmit the generated data packet to the light emitting device 30.

Furthermore, the first processor 130 may combine and operate at least two or more of the components included in the control console device 10.

Figure 4:
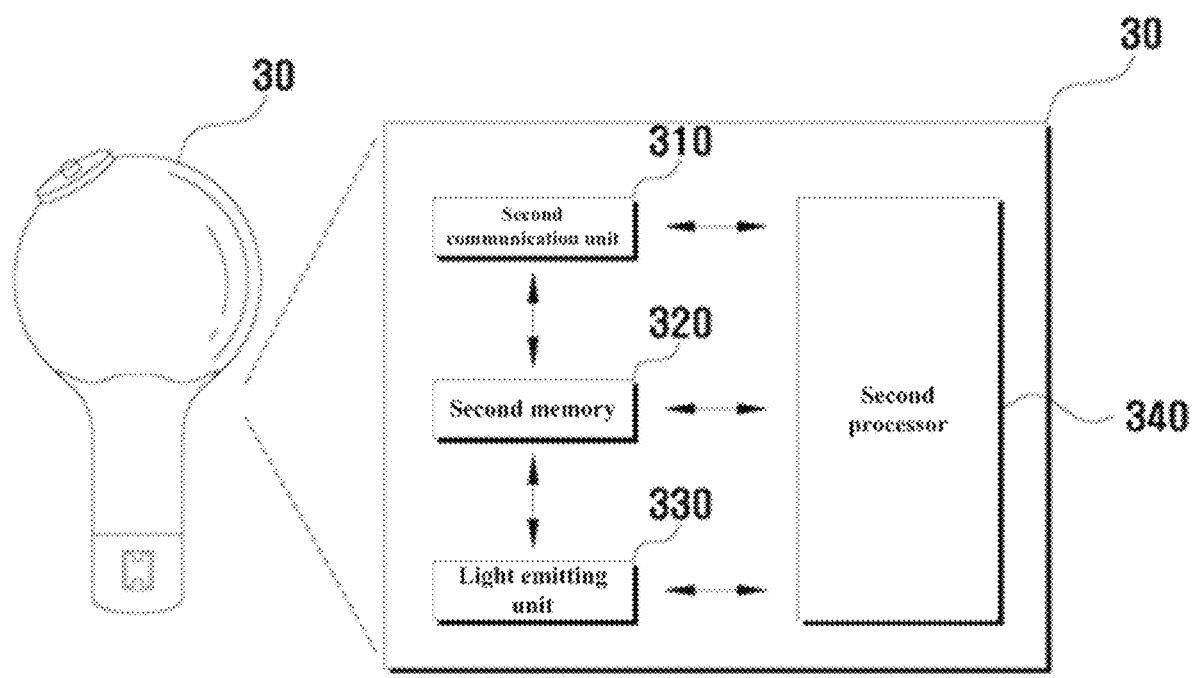
FIG. 4 is a block diagram illustrating a configuration of a light emitting device, according to an embodiment of the inventive concept.

FIG. 4 is a block diagram illustrating a configuration of a light emitting device, according to an embodiment of the inventive concept.

Referring to FIG. 4, the light emitting device 30 may include a second communication unit 310, a second memory 320, a light emitting unit 330, and a second processor 340. The components shown in FIG. 4 are not essential in implementing the light emitting device 30. The light emitting device 30 described herein may have more or fewer components than those listed above.

In more detail, the second communication unit 310 may include one or more modules that enable wired or wireless communication with the control console device 10, the transmitter 20, or a wireless communication terminal (e.g., a smartphone) (not shown) carried by an audience. Furthermore, the second communication unit 310 may include one or more modules connecting the light emitting device 30 to one or more networks.

The second communication unit 310 may communicate with various types of external devices depending on various types of communication methods. The second communication unit 310 may include at least one of a Wi-Fi chip, a Bluetooth chip, a wireless communication chip, an RFID, and an NFC chip.

According to the mobile communication technology of the present specification, a wireless signal is transmitted and received with at least one of a base station, an external terminal, and an external server on a mobile communication network established depending on technical standards or communication methods (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like).

Moreover, the wireless technologies of the present specification includes, for example, wireless LAN (WLAN), Wireless-Fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

In addition, the communication technology of the present specification may include a communication support technology by using at least one of Bluetooth, radio frequency identification (RFID), infrared data association (IrDA), ultra wideband (UWB), ZigBee, near field communication (NFC), Wi-Fi, Wi-Fi Direct, wireless universal serial bus (USB), transistor-transistor logic (TTL), USB, IEEE1394, Ethernet, musical instrument digital interface (MIDI), RS232, RS422, RS485, optical Communication, or coaxial cable communication.

The second memory 320 is a local storage medium supporting various functions of the light emitting device 30. The second memory 320 may store a plurality of application programs (or applications) running in the light emitting device 30, data for an operation of the light emitting device 30, and instructions. At least part of the application programs may be downloaded from an external device (e.g., an external server) through wireless communication. The application program may be stored in the second memory 220, may be installed in the light emitting device 30, and may be driven by the second processor 340 to perform an operation (or function) of the light emitting device 30.

Moreover, even when the power supply to the light emitting device 30 is cut off, data needs to be stored. Accordingly, the second memory 320 according to an embodiment of the inventive concept may be provided as a writable non-volatile memory (writable ROM) to reflect changes. That is, the second memory 320 may be provided as one of a flash memory, an EPROM, or an EEPROM. For convenience of description in an embodiment of the inventive concept, it is described that all instruction information is stored in the one second memory 320. However, an embodiment is not limited thereto. For example, the light emitting device 30 may include a plurality of memories.

Besides, the light emitting device 30 according to an embodiment of the inventive concept may receive control-related information (condition information) through the second communication unit 310 and may store the control-related information (condition information) in the second memory 320 such that the light emitting device 30 is controlled depending on at least one of group control, picture control and pixel control.

In an embodiment of the inventive concept, the control-related information (condition information) may include information that needs to be necessarily stored in the second memory 320 such that the light emitting device 30 is controlled depending on at least one of group control, picture control and pixel control. For example, the second memory 320 may store scene-specific group information for group control, scene-specific pixel information for pixel control, scene-specific emission information for picture control, and identification information of the transmitter 20.

In addition, the second memory 320 may store seat information of a ticket held by an audience. As large crowds gather in a performance hall, a specific light emitting device may fail to correctly store the condition information for emitting light to correspond to an emission pattern. In this case, there is a need to do individual control on the control console device 10 until the specific light emitting device receives the correct condition information. The control console device 10 may transmit a control signal for controlling only a specific light emitting device through the transmitter 20.

In addition, seat information of a ticket stored by the second memory 320 may include at least one of seat information displayed on the ticket (e.g., seat 1 in row A), location information (e.g., information of the corresponding seat) of the corresponding seat among seats in a performance hall, and identification information (e.g., the top left seat among 50,000 seats is 'No. 1' when performance direction data is generated) of the corresponding seat.

The condition information is entered into the light emitting device 30 at a step of producing the light emitting device 30 or may be entered through a terminal (e.g., a smartphone or a tablet PC) of an audience who possesses the light emitting device 30 before or after the entrance to the performance hall.

The audience (user) may electrically connect the light emitting device 30 to a terminal possessed by the audience and may receive condition information for performance direction through an application installed in a terminal.

The application may map the condition information onto the seat information included in ticket purchase information transmitted to a terminal (smart device) of the audience (user), may store the mapped result in the second memory 320, and may provide the mapped result to the light emitting device 30.

When a user purchases a ticket online, or when the user leaves contact information of his/her terminal (a smart device) upon purchasing a ticket, the user may receive purchase information through an online purchase application or a message such as E-mail, MMS, or KakaoTalk. Besides, when information access authority to an application that provided the purchase information is allowed, the user does not directly enter a performance date and seat information into the purchase information, but the application may obtain information automatically, may map condition information linked to the seat information, and may provide the mapped result to the light emitting device 30.

Alternatively, the application may download condition information from an external server, may store condition information in the second memory 320, and may provide condition information to the light emitting device 30.

The electrical connection may be made through short-range wireless communication or a physical connection between the terminal and the light emitting device 30.

Besides, according to an embodiment, the condition information may be entered in a step of checking a ticket before admission. In detail, the audience may perform the performance ticket checking step before entering the performance hall. In this case, the performance staff may directly enter seat information included in a ticket into the light emitting device 30 by hand or may receive the seat information included in the ticket by using an OCR function or an electronic code reader function through an information check device (not shown). The performance staff may provide the light emitting device 30 with condition information associated with location information corresponding to the seat information and may store the condition information in the second memory 320. In this case, the location information may be location information for each seat in the performance hall. Moreover, the information check device may provide condition information related to location information to the light emitting device 30 through communication with an external server (not illustrated) or may store condition information related to location information in advance at a step of planning a performance and may provide the condition information to the light emitting device 30.

Also, the information check device may include an electronic device such as a kiosk (not shown). In this case, the audience may directly perform the performance ticket check step through the kiosk. The kiosk may receive electronic code information included in the ticket, may provide the light emitting device 30 with the condition information associated with location information corresponding to the electronic code information, and may store the condition information in the second memory 320. In this case, the kiosk may store the condition information associated with location information in advance, through communication with an external server (not shown) or at a step of planning a performance.

Here, the aforementioned condition information may be information included in the performance direction data.

The light emitting unit 330 may include one or more light source elements. The light source element may be, for example, a light emitting diode (LED), or the like. Also, the light emitting unit 330 may output light of various colors according to RGB color information by using a light source element.

According to an embodiment of the inventive concept, each of the transmitters 20 may use a different wireless frequency bandwidth (channel). In this way, data packets transmitted from each of the transmitters 20 may have different wireless bandwidths.

The second processor 340 may compare identification information of the transmitter 20 stored in the second memory 320 with identification information of the transmitter 20 included in the received data packet every preset time unit (e.g., a minute or a hour) or whenever an event (e.g., when the next song is played or an audience leaves a seat and comes back) occurs. When the identification information of the transmitter 20 stored in the second memory 320 is the same as the identification information of the transmitter 20 included in the received data packet, the second processor 340 may receive only the data packet received through the wireless bandwidth of a signal transmitted by the corresponding transmitter 20.

According to an embodiment of the inventive concept, the second memory 320 may store identification information of the transmitter 20 and wireless bandwidth to be used by the transmitter 20 in a list. In detail, the light emitting device 30 may store the identification information of the transmitter 20 and the wireless bandwidth to be used by the transmitter 20 in the second memory 320 in a format of a list in the same way. When a data packet including identification information matching the identification information of the transmitter 20 stored in the second memory 320 is not received, or when the received data packet is not at an appropriate wireless signal level, the light emitting device 30 needs to scan the entire wireless bandwidth (channel) to receive a data packet. Accordingly, the second processor 340 may store the list including the identification information of the transmitter 20 to be received by the light emitting device 30 and the wireless bandwidth of a signal transmitted by the transmitter and then may partially (selectively) scan a channel with reference to the list.

The second processor 340 may receive the data packet from the control console device 10 through the second communication unit 310 and may perform an operation of emitting light in the data packet.

For example, when the data packet is a control signal for group control (that is, when the data packet includes direction information for group control), the second processor 340 may determine which group an audience belongs to in the corresponding scene, based on the condition information stored in the second memory 320, and may cause the light emitting unit 330 to emit light depending on a color matching the corresponding group.

As another example, when the data packet is a control signal for pixel control (that is, when the data packet includes direction information for pixel control), the second processor 340 may determine which pixel an audience belongs to in the corresponding scene, based on the condition information stored in the second memory 320, and may cause the light emitting unit 330 to emit light depending on a color matching the corresponding pixel.

As another example, when the data packet is a control signal for picture control (that is, when the data packet includes direction information for picture control), the second processor 340 may determine a color corresponding to the corresponding scene, based on the condition information stored in the second memory 320, and may cause the light emitting unit 330 to emit light depending on a color.

Furthermore, the second processor 340 may combine and operate at least two or more of the components included in the light emitting device 30.

As described above, for group control, the light emitting device 30 directly emits light in the color matched to a group, to which it belongs, in the corresponding scene depending on the group control method; for pixel control, the light emitting device 30 emits light with a color matched to a pixel, to which it belongs, in the corresponding scene depending on the pixel control method; and, for picture control, the light emitting device 30 emits light with a color matched to the light emitting device 30 in the corresponding scene depending on the picture control method. As illustrated in FIG. 2, each direction scene may be directed in various ways for each performance direction.

Furthermore, the light emitting device 30 computes a color to be emitted in each scene according to each control method, by including direction information about a plurality of control methods in a data packet, and thus the inventive concept may allow the light emitting device 30 to be expressed in more diverse colors. Accordingly, direction scenes may be implemented more colorfully.

Hereinafter, a method of controlling emission of the light emitting device 30 by using a plurality of control methods will be described in detail with reference to FIGS. 5 to 20.

Figure 5:
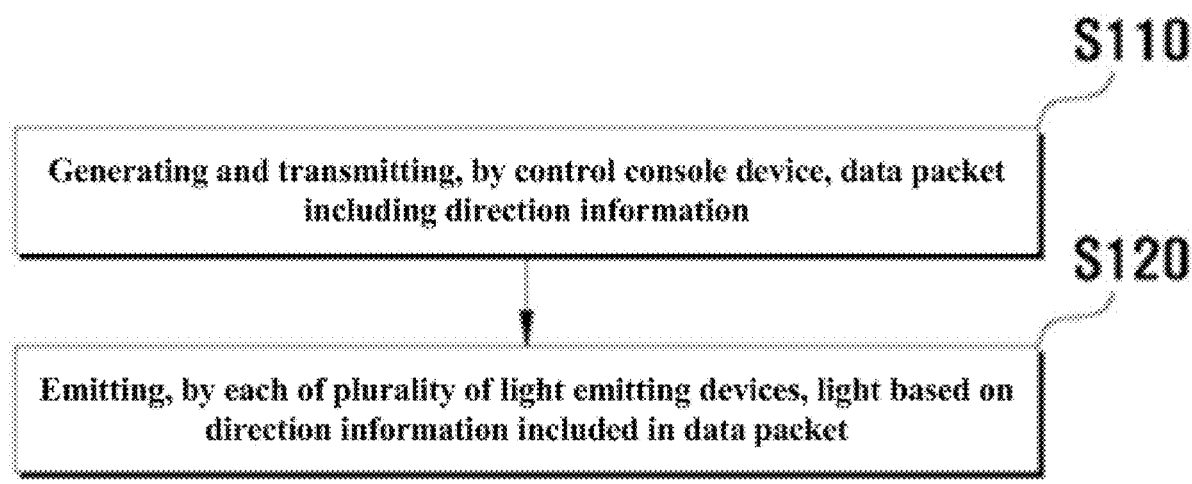
FIG. 5 is a flowchart illustrating a performance directing method, according to an embodiment of the inventive concept.

FIG. 5 is a flowchart illustrating a performance directing method, according to an embodiment of the inventive concept.

Figure 6:
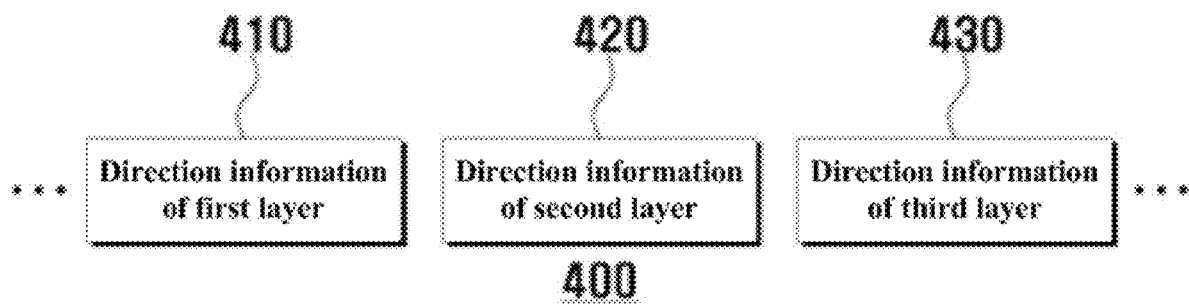
FIG. 6 is an exemplary diagram for describing a data packet, according to an embodiment of the inventive concept.

FIG. 6 is an exemplary diagram for describing a data packet, according to an embodiment of the inventive concept.

FIG. 7 is an exemplary diagram for describing direction information of a first layer included in the data packet of FIG. 6.

FIG. 8 is an exemplary diagram for describing direction information of a second layer included in the data packet of FIG. 6.

Figure 9:
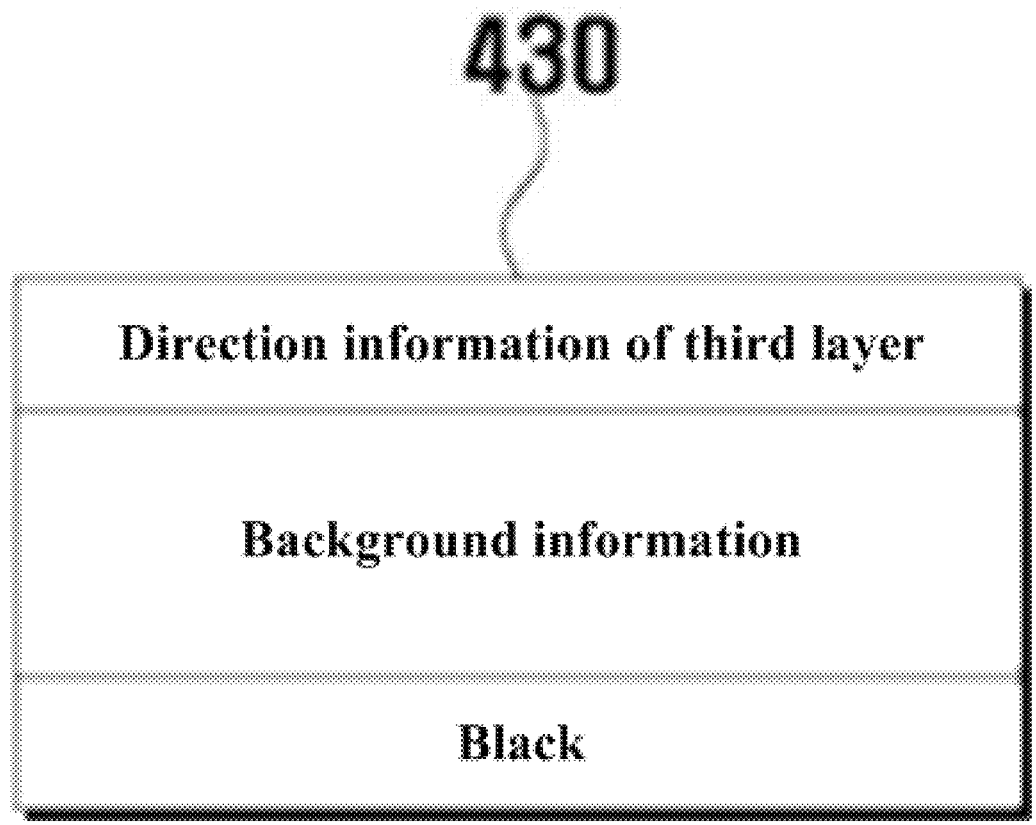
FIG. 9 is an exemplary diagram for describing direction information of a third layer included in the data packet of FIG. 6.

FIG. 9 is an exemplary diagram for describing direction information of a third layer included in the data packet of FIG. 6.

FIG. 10 is an exemplary diagram for describing condition information of a light emitting device, according to an embodiment of the inventive concept.

Figure 11A:
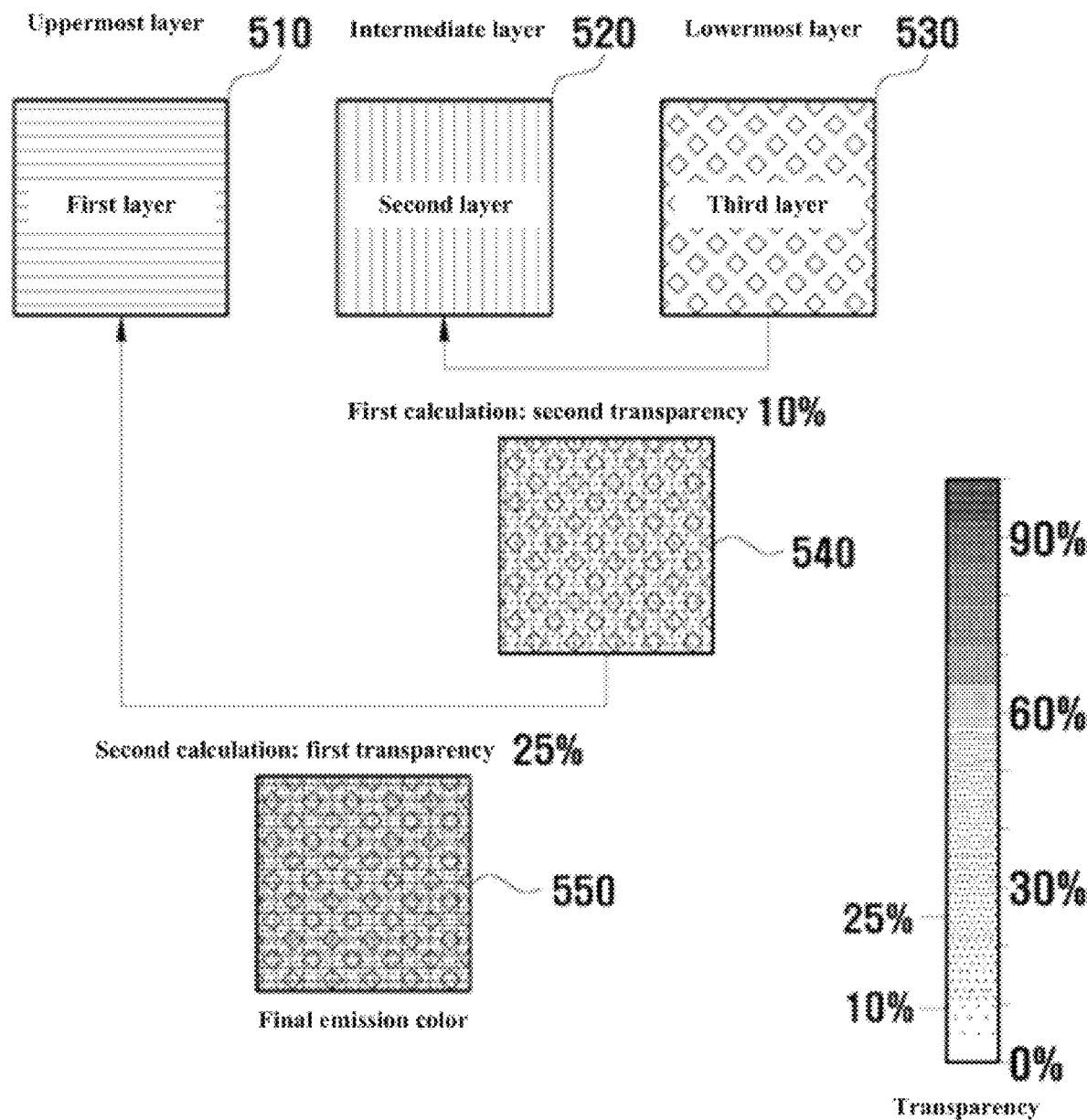
FIGS. 11A and 11B are exemplary views for describing an emission color according to a masking value of an uppermost layer, according to an embodiment of the inventive concept.
Figure 11B:
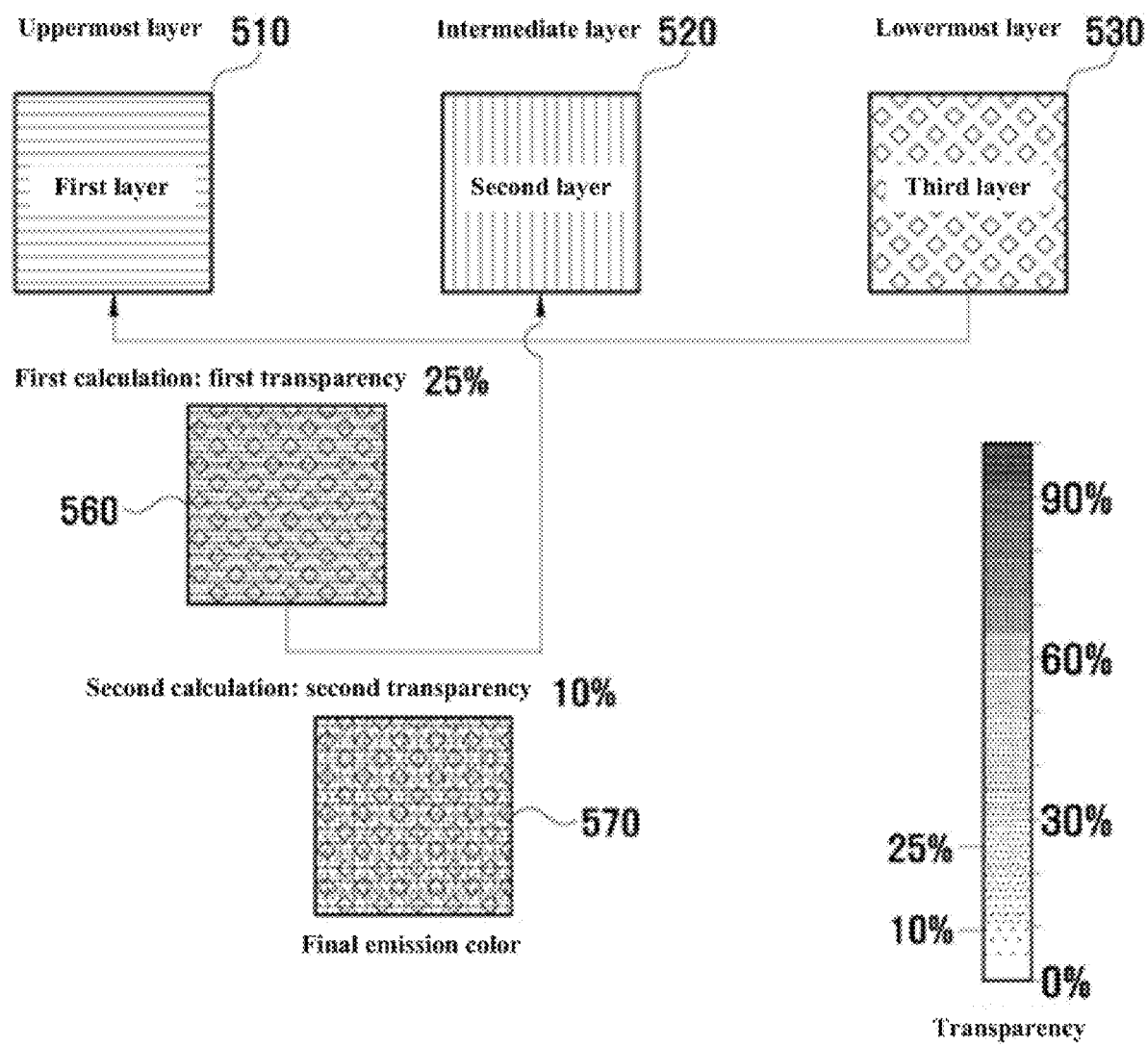

FIGS. 11A and 11B are exemplary views for describing an emission color according to a masking value of an uppermost layer, according to an embodiment of the inventive concept.

Figure 12:
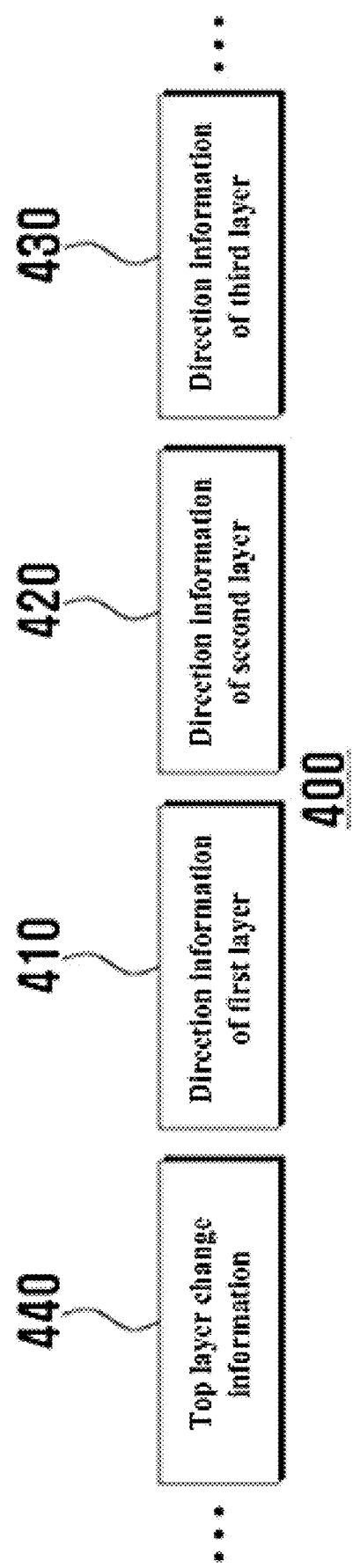
FIG. 12 is an exemplary diagram for describing that top layer change information is included in the data packet of FIG. 6.

FIG. 12 is an exemplary diagram for describing that top layer change information is included in the data packet of FIG. 6.

FIGS. 13A and 13B are exemplary views for describing top layer change information of FIG. 12.

FIG. 14 is an exemplary view for describing an emission color value, a masking value, and a transparency value for each layer corresponding to condition information of each of a plurality of light emitting devices, according to an embodiment of the inventive concept.

FIGS. 15A to 15D are exemplary views for describing a method of calculating an emission color of each of a plurality of light emitting devices when a top layer change value of 1 is applied equally to a plurality of light emitting devices, according to an embodiment of the inventive concept.

Figure 15A:
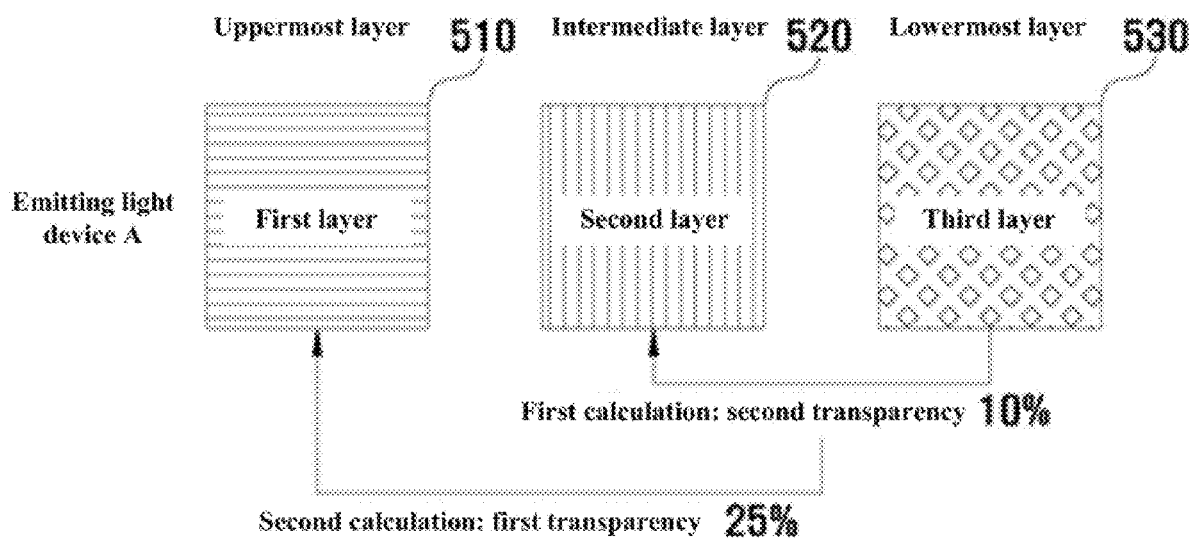
FIGS. 15A to 15D are exemplary views for describing a method of calculating an emission color of each of a plurality of light emitting devices when a top layer change value of 1 is applied equally to a plurality of light emitting devices, according to an embodiment of the inventive concept.
Figure 15B:
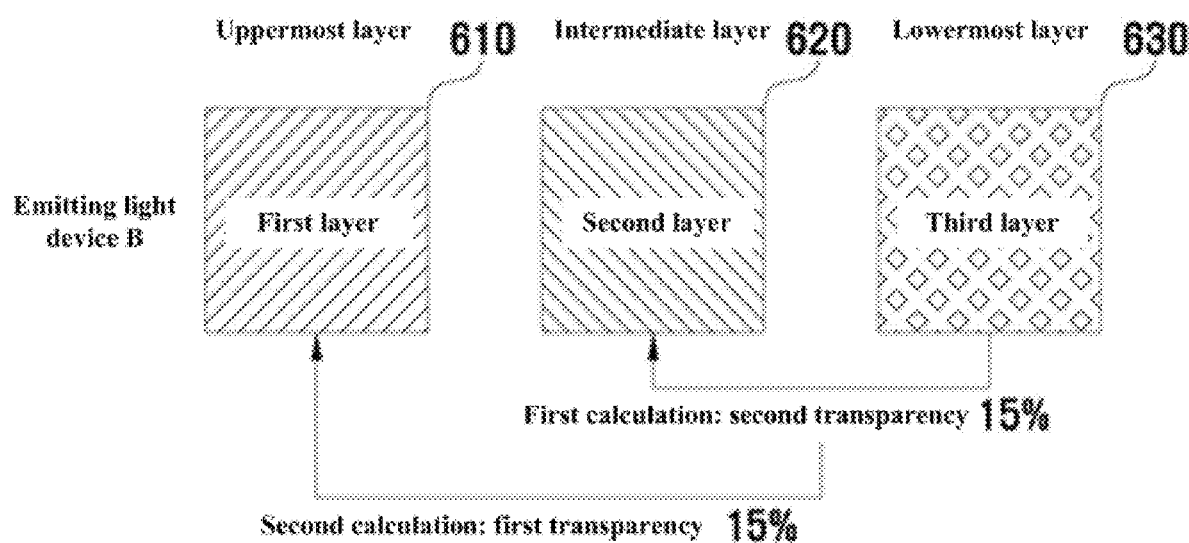
Figure 15C:
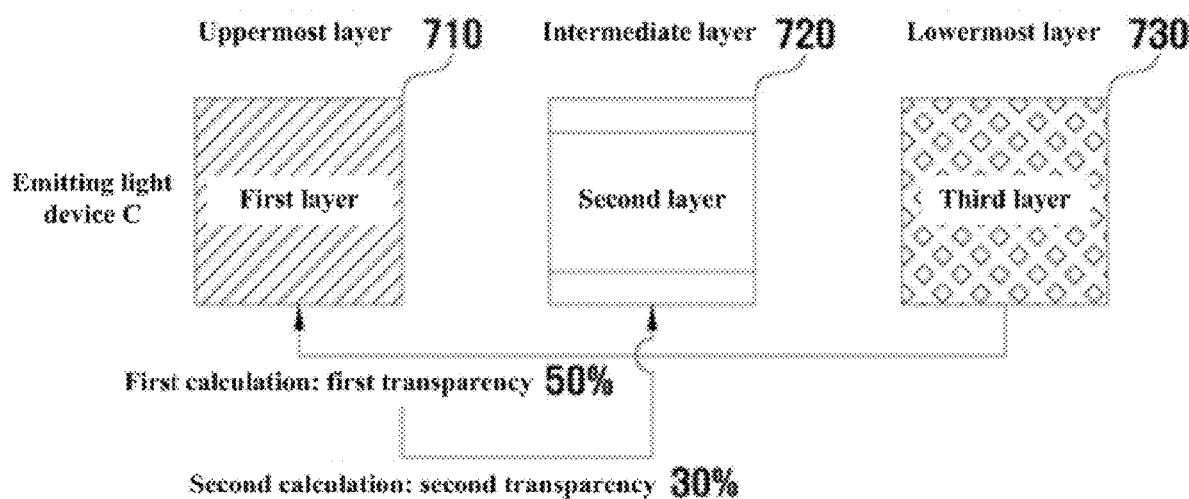
Figure 15D:
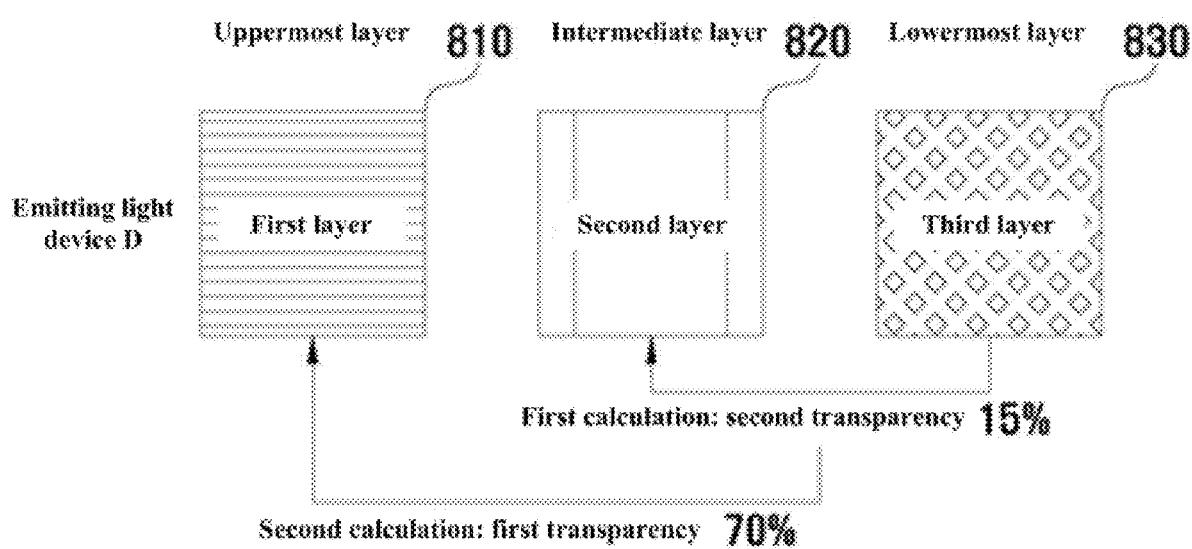
Figure 16:
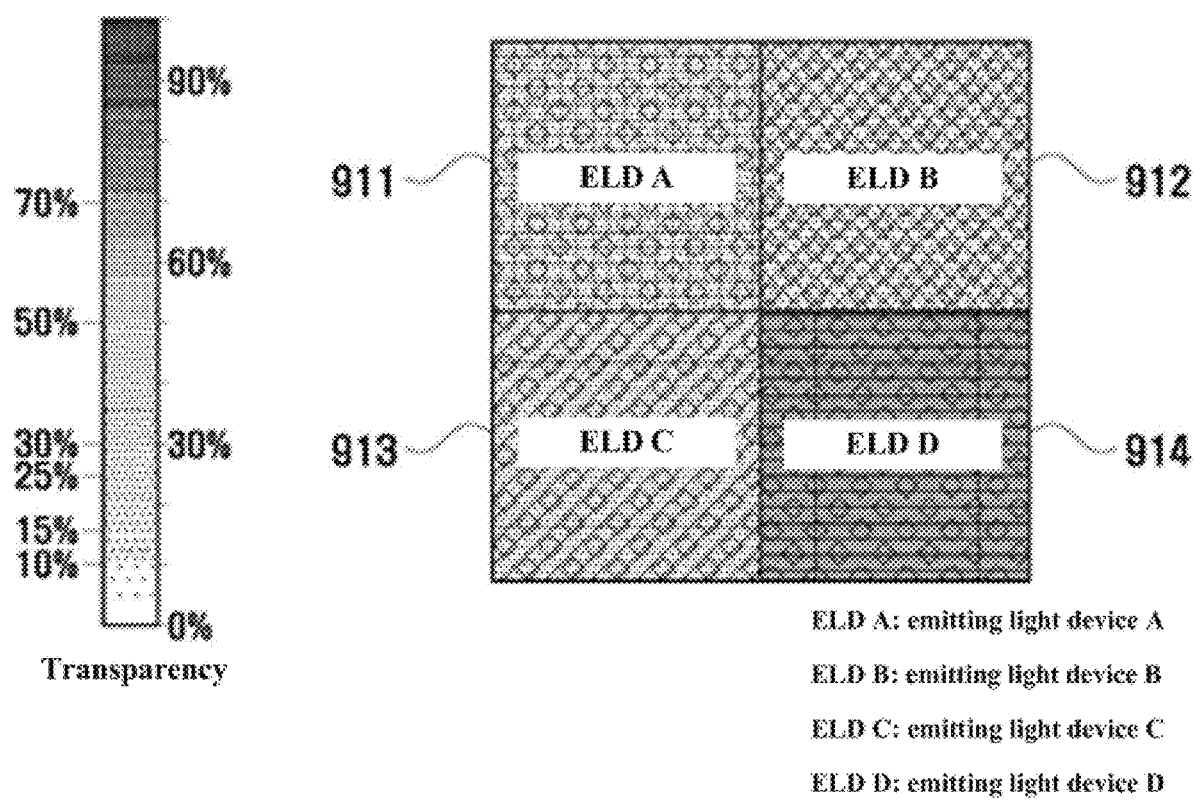
FIG. 16 is an exemplary diagram for describing a final direction scene directed depending on the calculation result of FIGS. 15A to 15D.

FIG. 16 is an exemplary diagram for describing a final direction scene directed depending on the calculation result of FIGS. 15A to 15D.

FIGS. 17A to 17D are exemplary views for describing a method of calculating an emission color of each of a plurality of light emitting devices when a top layer change value of 0 is applied equally to a plurality of light emitting devices, according to an embodiment of the inventive concept.

Figure 17A:
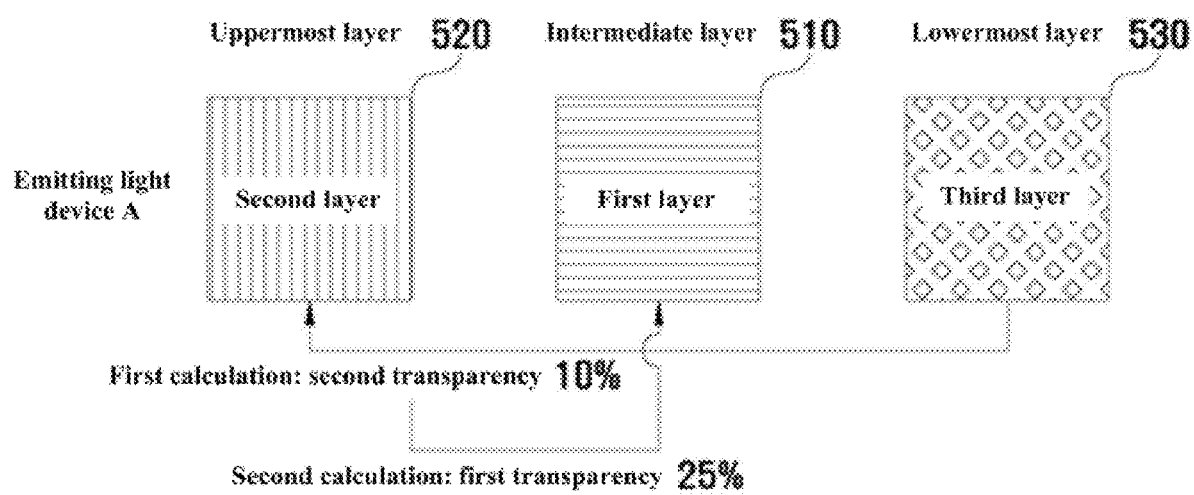
FIGS. 17A to 17D are exemplary views for describing a method of calculating an emission color of each of a plurality of light emitting devices when a top layer change value of 0 is applied equally to a plurality of light emitting devices, according to an embodiment of the inventive concept.
Figure 17B:
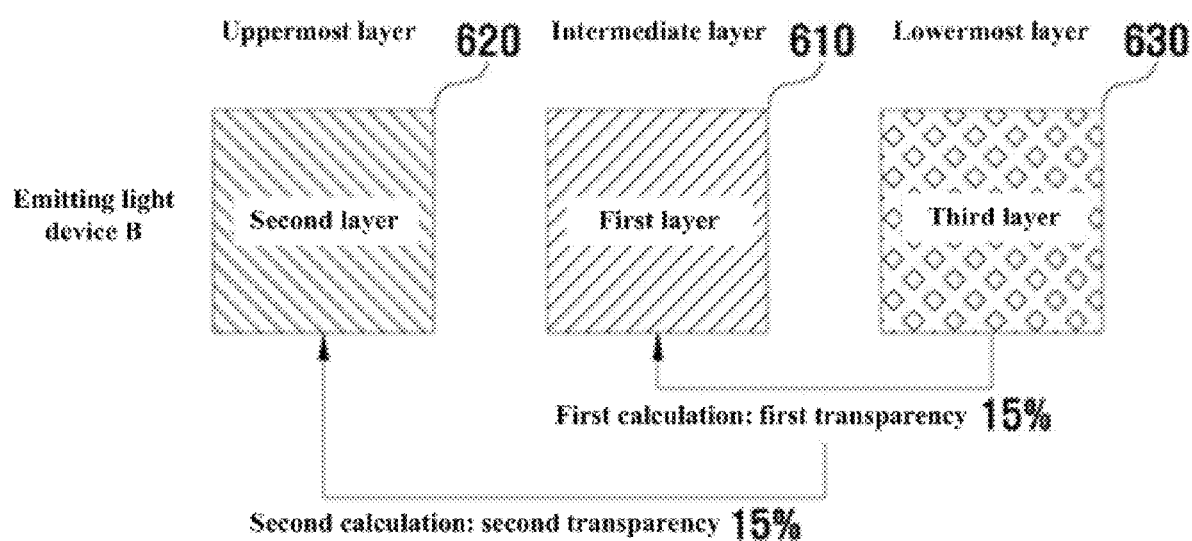
Figure 17C:
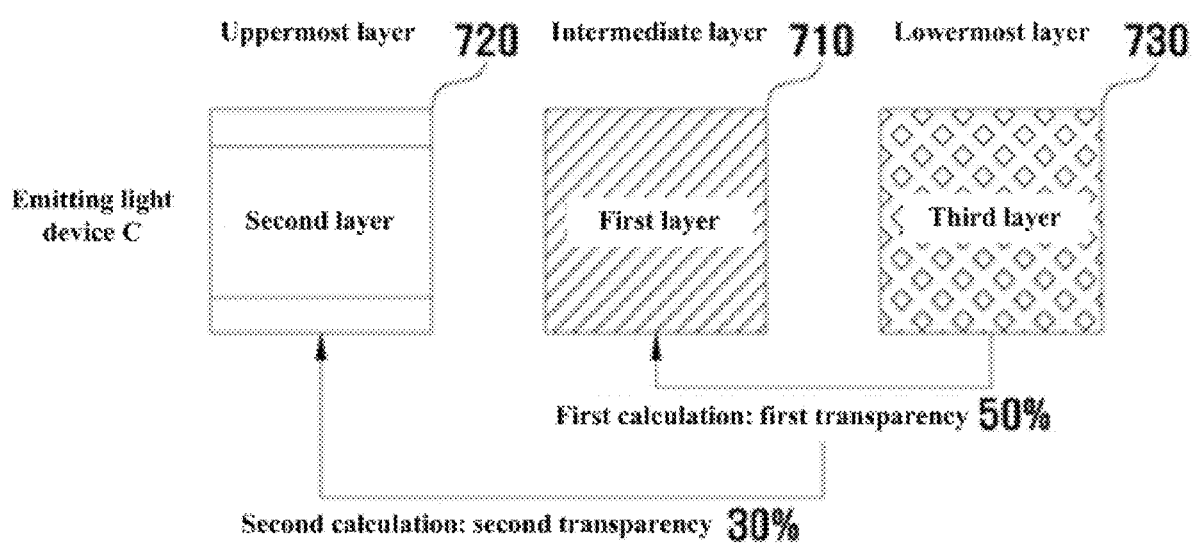
Figure 17D:
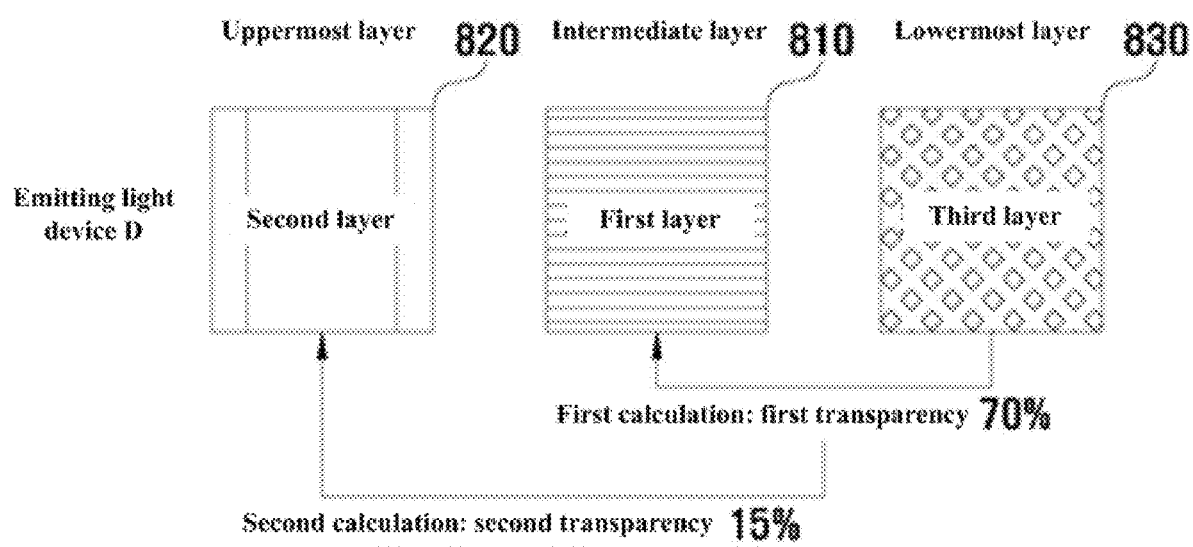
Figure 18:
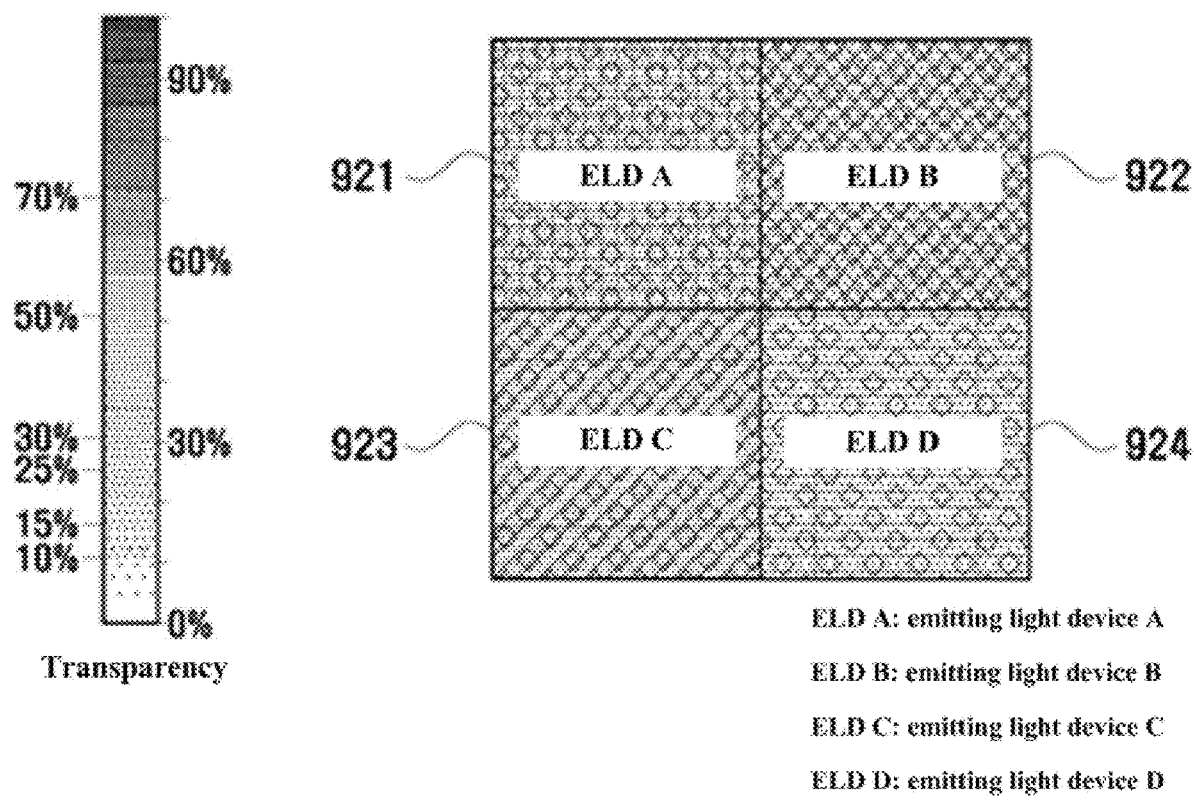
FIG. 18 is an exemplary diagram for describing a final direction scene directed depending on the calculation result of FIGS. 17A to 17D.

FIG. 18 is an exemplary diagram for describing a final direction scene directed depending on the calculation result of FIGS. 17A to 17D.

FIGS. 19A to 19D are exemplary views for describing a method of calculating an emission color of each of a plurality of light emitting devices when a top layer change value of 1 or 0 is applied differently to a plurality of light emitting devices, according to an embodiment of the inventive concept.

Figure 19A:
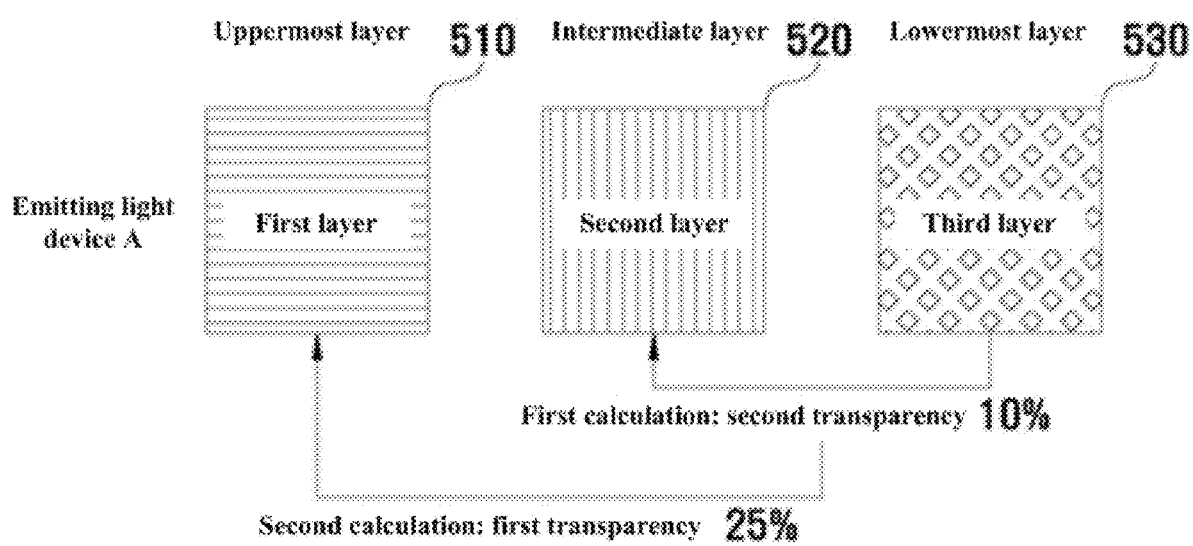
FIGS. 19A to 19D are exemplary views for describing a method of calculating an emission color of each of a plurality of light emitting devices when a top layer change value of 1 or 0 is applied differently to a plurality of light emitting devices, according to an embodiment of the inventive concept.
Figure 19B:
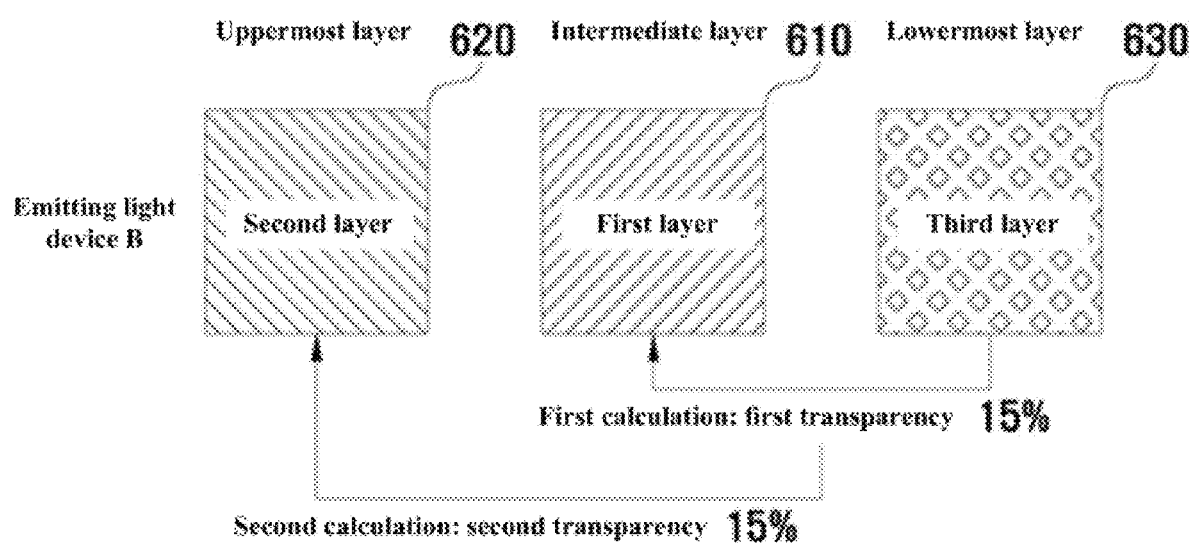
Figure 19C:
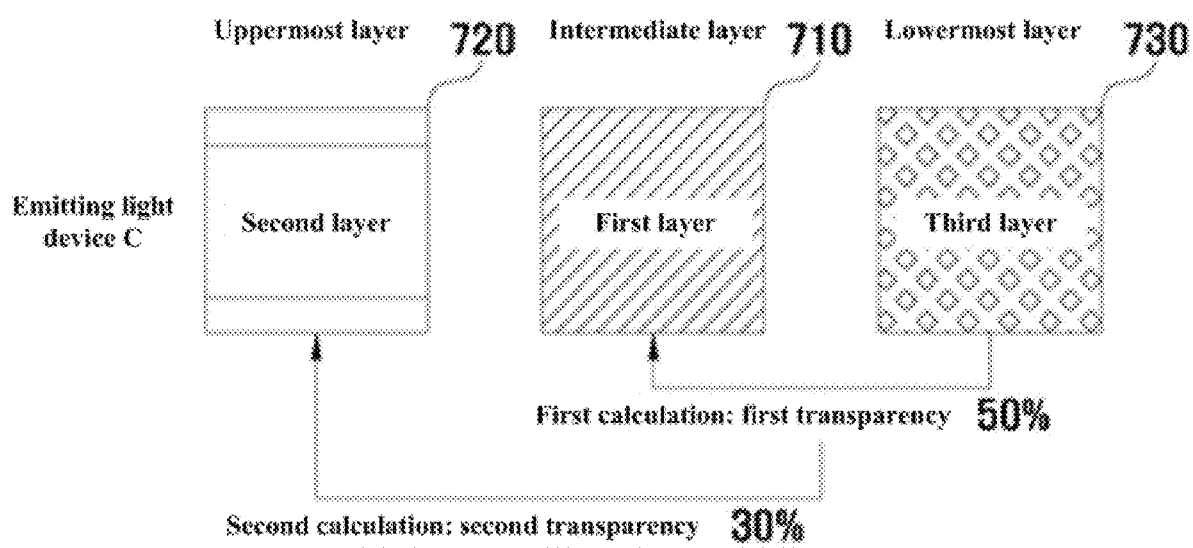
Figure 19D:
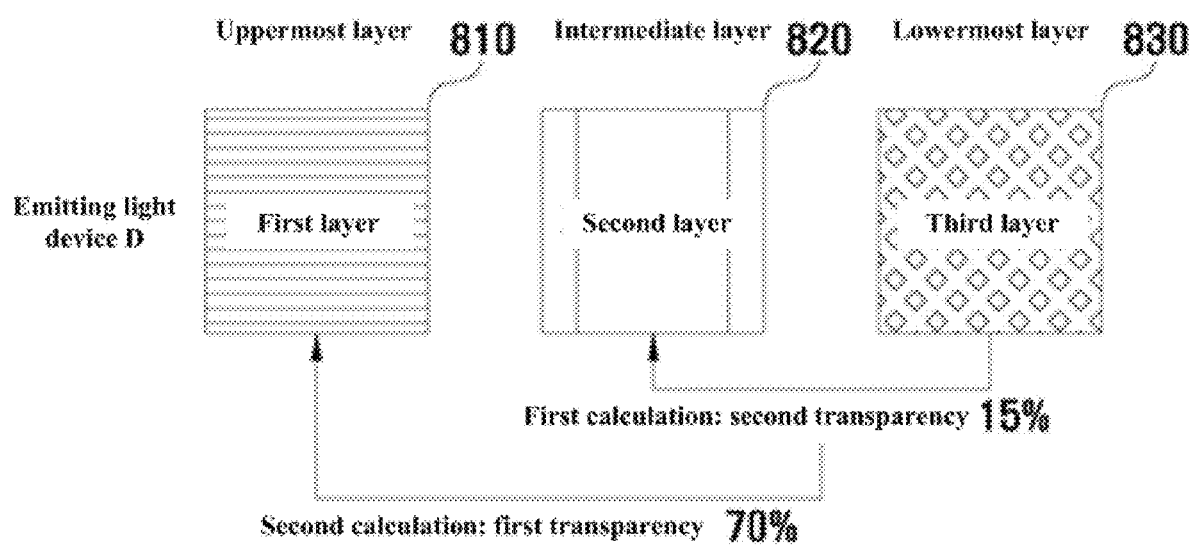
Figure 20:
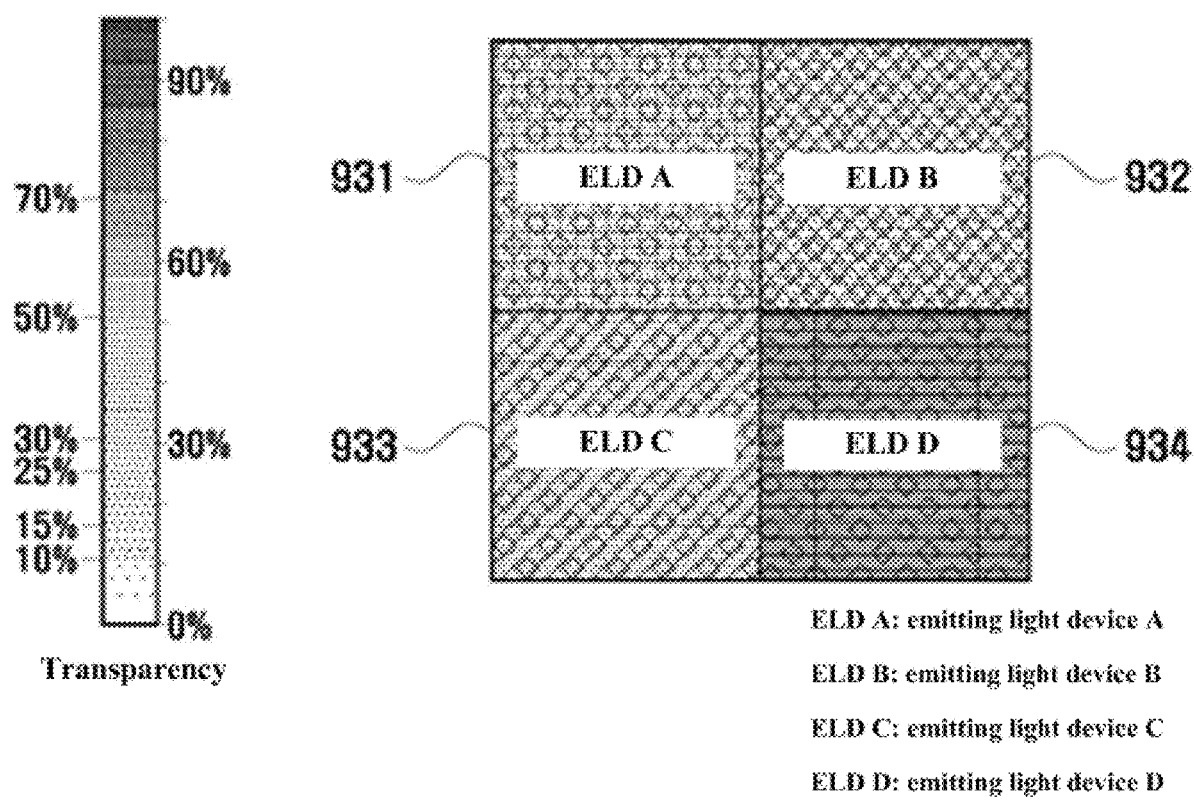
FIG. 20 is an exemplary diagram for describing a final direction scene directed depending on the calculation result of FIGS. 19A to 19D.

FIG. 20 is an exemplary diagram for describing a final direction scene directed depending on the calculation result of FIGS. 19A to 19D.

Hereinafter, when configurations and operations of the control console device 10 and the light emitting device 30 of the performance directing system 10 according to an embodiment of the inventive concept are described with reference to FIGS. 5 to 20, it will be described that the control console device 10 controls the light emitting device 30 located in one zone through the single transmitter 20.

Referring to FIG. 5, the first processor 130 of the control console device 10 may generate a data packet including direction information for each of a plurality of layers and may transmit the data packet through the first communication unit 110 (S110).

In the specification, a layer may be a virtual concept applied to conveniently calculate a plurality of colors for one direction scene.

The plurality of layers may include a first layer, a second layer, and a third layer. However, an embodiment is not limited thereto. For example, the number of layers may be larger or smaller.

Here, the first layer may mean a layer for group control or pixel control; the second layer may mean a layer for picture control; and, the third layer may mean a background layer. However, an embodiment is not limited thereto. For example, all layers other than the third layer that is a background layer may be a layer for at least one of the group control, the pixel control and the picture control. According to the embodiment, the third layer, which is the last layer, may also be a layer, not the background layer, for at least one of the group control, the pixel control and the picture control.

Here, the first layer, which is a layer for the group control or the pixel control, may be an uppermost layer; the second layer, which is a layer for the picture control, may be an intermediate layer; and, the third layer, which is the background layer, may be a lowermost layer. The control console device 10 may store the order of the first layer being the uppermost layer, the second layer being the intermediate layer, and the third layer being the lowermost layer, by default. However, an embodiment is not limited thereto. For example, the control console device 10 may store default setting values in a different order in some cases.

The control console device 10 may generate a data packet 400 including direction information for each direction scene in each performance direction based on pre-stored performance direction data received from another device (e.g., a data generation device).

Referring to FIG. 6, the data packet 400 may include direction information 410 of the first layer, direction information 420 of the second layer, and direction information 430 of the third layer.

According to an embodiment of the inventive concept, because a direction scene for the first layer is different from a direction scene for the second layer in the data packet 400 depending on the control method, the direction information is also divided into direction information for the first layer and direction information for the second layer. At this time, because the third layer is a background layer, information about a background color is included as direction information.

In detail, referring to FIG. 7, the direction information 410 of the first layer may include number information, emission color information, first masking information, and first transparency information, which correspond to the first direction scene.

Here, the number information may indicate the number of the first direction scene to be displayed through group control or pixel control at a current time point (a current performance direction section).

The emission color information may indicate color information matched to each classification (group or pixel) in the number of the first direction scene. In FIG. 7, "red", "yellow", "blue" and "white" are illustrated for convenience of description. However, the emission color information may be expressed as a color value based on RGB for each classification. For example, "red" may be expressed as (255, 0, 0).

The first masking information may indicate a masking value allocated to each classification in the number of the first direction scene. Here, the masking value may mean a value for determining a priority between the first layer and a layer located behind the first layer. When the masking value is 0, the first layer has priority over a layer located behind the first layer. When the masking value is 1, the first layer does not have priority over the layer located behind the first layer (i.e., the layer located behind the first layer has priority over the first layer). At this time, the layer located behind the first layer may be the second layer or the third layer.

The first transparency information may indicate a transparency value allocated to each classification in the number of the first direction scene. Here, the transparency value may mean a value, which is used to perform alpha blending on the first layer after being applied to the first layer. The transparency value may be determined as a value between 0% and 100%. As the value increases, the degree of transparency of the first layer may increase.

Here, in the case of classification for the first masking information and classification for the first transparency information, the plurality of light emitting devices 30 may not be distinguished from one another based on group or pixel. The plurality of light emitting devices 30 may be distinguished depending on various situations, such as the shape or pattern in which each of the plurality of light emitting devices 30 is to be expressed at the corresponding number of the first direction scene. However, an embodiment is not limited thereto. For example, the classification for first masking information and the classification for first transparency information may be made based on group or pixel.

The classification for the emission color information, the classification for the first masking information, and the classification for the first transparency information may be equally or differently applied to each of the plurality of light emitting devices 30.

For an identical application, when the specific light emitting device 30 belongs to classification 1 for the emission color information, the specific light emitting device 30 may also belong to classification 1 for the first masking information and the first transparency information.

For a different application, the specific light emitting device 30 may belong to classification 1 for the emission color information, the specific light emitting device 30 may belong to classification 2 for the first masking information, and the specific light emitting device 30 may belong to classification 3 for the first transparency information.

For an identical application, the number of classifications for the emission color information, the number of classifications for the first masking information, and the number of classifications for the first transparency information need to be the same as one another. However, for a different application, the number of classifications for the emission color information, the number of classifications for the first masking information, and the number of classifications for the first transparency information may be the same as or different from one another.

Referring to FIG. 8, the direction information 420 of the second layer may include number information, second masking information, and second transparency information, which correspond to the second direction scene.

Here, the number information may indicate the number of the second direction scene to be displayed through picture control at a current time point (a current performance direction section).

The second masking information may indicate a masking value allocated to each classification in the number of the second direction scene. Here, the masking value may mean a value for determining a priority between the second layer and a layer located behind the second layer. When the masking value is 0, the second layer has priority over a layer located behind the second layer. When the masking value is 1, the second layer does not have priority over the layer located behind the second layer (i.e., the layer located behind the second layer has priority over the second layer). At this time, the layer located behind the second layer may be the first layer or the third layer.

The second transparency information may indicate a transparency value allocated to each classification in the number of the second direction scene. Here, the transparency value may mean a value, which is used to perform alpha blending on the second layer after being applied to the second layer. The transparency value may be determined as a value between 0% and 100%. As the value increases, the degree of transparency of the second layer may increase.

Here, in the case of classification for the second masking information and classification for the second transparency information, the plurality of light emitting devices 30 may be distinguished from one another depending on various situations, such as a shape or pattern in which each of the plurality of light emitting devices 30 is to be expressed at the corresponding number of the second direction scene.

The classification for the second masking information and the classification for the second transparency information may be equally or differently applied to each of the plurality of light emitting devices 30.

For an identical application, when the specific light emitting device 30 belongs to classification 1 for the second masking information, the specific light emitting device 30 may also belong to classification 1 for the second transparency information.

For a different application, the specific light emitting device 30 may belong to classification 1 for the second masking information, and the specific light emitting device 30 may belong to classification 3 for the second transparency information.

For an identical application, the number of classifications for the second masking information and the number of classifications for the second transparency information need to be the same as one another. However, for a different application, the number of classifications for the second masking information and the number of classifications for the second transparency information may be the same as or different from one another.

Referring to FIG. 9, the direction information 430 of the third layer may include background color information. That is, all of the plurality of light emitting devices 30 may be expressed with the same color (e.g., black or white) for the third layer.

In FIG. 9, for convenience of description, it is described that the background color information corresponds to "black". However, the background color information may be expressed as a color value based on RGB or the like. For example, "black" may be expressed as (0, 0, 0).

Returning to FIG. 5, the second processor 340 of the plurality of light emitting devices 30 may receive the data packet 400 from the control console device 10 through the second communication unit 310 and may allow the light emitting unit 330 to emit light based on the direction information included in the data packet 400 (S120).

Condition information different from each other may be stored in each of the plurality of light emitting devices 30. That is, as described above, each of the light emitting device 30 may store condition information related to its location information (i.e., seat information of a user who has the corresponding light emitting device), and thus the light emitting device 30 may emit light in a different color for each seat. To this end, each of the light emitting device 30 needs to identify values (for emission) corresponding to its condition information from the received data packet 400.

In detail, each of the plurality of light emitting devices 30 may identify the first emission color value, the first masking value, and the first transparency value in the first direction scene corresponding to the condition information by using the direction information of the first layer, may identify a second emission color value, a second masking value, and a second transparency value in the second direction scene corresponding to the condition information by using the direction information of the second layer, and may identify a background color value based on the direction information of the third layer.

Referring to FIG. 10, the light emitting device 'A' may store classification information about emission color, classification information about masking, and classification information about transparency for each number of the first direction scene of the first layer, and may store emission color information, classification information about masking, and classification information about transparency for each number of the second direction scene of the second layer. Here, condition information about the third layer may not be separately stored. Because the background color value for the third layer is included in the direction information and transmitted, it is possible to identify the background color value for the third layer without a need to compare with condition information.

As illustrated in FIG. 10, when the first direction scene in the light emitting device A corresponds to 1, the classification information about emission color may be 1, the classification information about masking may be 4, and the classification information about transparency may be 1. When the second direction scene in the light emitting device A corresponds to 1, the emission color information may be "red", the classification information about masking may be 1, and the classification information about transparency may be 1. In FIG. 10, "red", "white", "yellow", "sky blue" and "green" are illustrated for convenience of description. However, the emission color information may be expressed as a color value based on RGB for each number. For example, "red" may be expressed as (255, 0, 0).

In the case where the data packet 400 including the direction information of each layer as shown in FIGS. 7 to 9 is received in the specific performance direction section, when the first direction scene in the light emitting device A corresponds to 1, the classification information about emission color may be 1, the classification information about masking may be 4, and the classification information for transparency may be 1. Accordingly, at the first direction scene, the first emission color value of the light emitting device A may be "red", the first masking value of the light emitting device A may be 0, and the first transparency value of the light emitting device A may be 25%.

Moreover, when the second direction scene in the light emitting device A corresponds to 4, the emission color information may be "sky blue", the classification information about masking may be 3, and the classification information for transparency may be 2. Accordingly, at the second direction scene, the second emission color value of the light emitting device A may be "sky blue", the second masking value of the light emitting device A may be 1, and the second transparency value of the light emitting device A may be 10%.

As such, each of the light emitting devices 30 may compare its condition information with the received data packet 400, may identify the values for determining the final emission color, and may emit light in a color (the final emission color) allocated to each of the light emitting devices 30 in each direction scene (the final direction scene) in each performance direction section through a calculation using these values.

Hereinafter, it will be described in detail that each of the light emitting device 30 determines its final emission color through a calculation.

First of all, each of the plurality of light emitting devices 30 may determine the priority between a first layer being the uppermost layer and a second layer being the intermediate layer based on the direction information 410 of the first layer.

Next, each of the plurality of light emitting devices 30 may perform calculations by using at least one of the direction information 410 of the first layer, the direction information 420 of the second layer, and the direction information 430 of the third layer depending on the priority determination and may emit light based on the calculated result.

In detail, the priority may be determined by using the first masking value for the first layer, which is the uppermost layer. As described above, when the masking value is 0, the first layer has priority over a layer (the second layer that is an intermediate layer) located behind the first layer. When the masking value is 1, the first layer does not have priority over the layer (the second layer that is an intermediate layer) located behind the first layer (i.e., the layer located behind the first layer has priority over the first layer).

Besides, when the first layer, which is the uppermost layer, has priority over the second layer, which is the intermediate layer, according to priority determination, each of the plurality of light emitting devices 30 may perform the first calculation based on the direction information 420 of the second layer and the direction information 430 of the third layer, may perform a second calculation by using the first calculated result and the direction information of the first layer, and may emit light based on the second calculated result.

In more detail, in the case where the first layer, which is the uppermost layer, has priority over the second layer, which is the intermediate layer, depending on the priority determination, alpha blending of the second emission color value and the background color value may be performed based on the second transparency information when the first calculation is performed, and alpha blending of the first calculated result and the first emission color value may be performed based on the first transparency information when the second calculation is performed. Accordingly, each of the light emitting devices 30 may emit light with the final emission color determined depending on the second calculated result.

On the other hand, when the second layer, which is the intermediate layer, has priority over the first layer, which is the uppermost layer, according to priority determination, each of the plurality of light emitting devices 30 may perform the first calculation based on the direction information 410 of the first layer and the direction information 430 of the third layer, may perform a second calculation by using the first calculated result and the direction information of the second layer, and may emit light based on the second calculated result.

In more detail, in the case where the second layer, which is the intermediate layer, has priority over the first layer, which is the uppermost layer, depending on the priority determination, alpha blending of the first emission color value and the background color value may be performed based on the first transparency information when the first calculation is performed, and alpha blending of the first calculated result and the second emission color value may be performed based on the second transparency information when the second calculation is performed. Accordingly, each of the light emitting devices 30 may emit light with the final emission color determined depending on the second calculated result.

A method for determining the final emission color in the case where a first layer 510 has priority over a second layer 520 when the first layer 510 is an uppermost layer, the second layer 520 is an intermediate layer, and a third layer 530 is a lowermost layer will be described with reference to FIG. 11A.

The first layer 510 may take priority. Accordingly, the second transparency (10%) may be applied to the second emission color value (i.e., sky blue) of the second layer 520, and then alpha blending (the first calculation) of the second emission color value and the background color value of the third layer 530 may be performed. In this case, the first calculation result 540 may be derived.

Then, the first transparency (25%) may be applied to the first emission color value (i.e., red) of the first layer 510, and then alpha blending (the second calculation) of the first emission color value and the first calculation result may be performed. In this case, the second calculation result, that is, the final emission color 550 may be derived.

A method for determining the final emission color in the case where the first layer 510 does not have priority over the second layer 520 (the second layer 520 takes priority) when the first layer 510 is an uppermost layer, the second layer 520 is an intermediate layer, and the third layer 530 is a lowermost layer will be described with reference to FIG. 11B.

The second layer 520 may take priority. Accordingly, the first transparency (25%) may be applied to the first emission color value (i.e., red) of the first layer 510, and then alpha blending (the first calculation) of the first emission color value and the background color value of the third layer 530 may be performed. In this case, the first calculation result 560 may be derived.

Then, the second transparency (10%) may be applied to the second emission color value (i.e., sky blue) of the second layer 520, and then alpha blending (the second calculation) of the second emission color value and the first calculation result 560 may be performed. In this case, the second calculation result, that is, a final emission color 570 may be derived.

In this way, a color that is finally emitted by the light emitting device 30 may be different depending on which layer is prioritized among the first layer and the second layer.

In the meantime, referring to FIG. 12, the data packet 400 may further include top layer change information 440.

Here, the top layer change information 440 may be information indicating whether to change the order of an uppermost layer and an intermediate layer among a plurality of layers.

As described above, the order of a plurality of layers is that the first layer is set as the uppermost layer, the second layer is set as the intermediate layer, and the third layer is set as the lowermost layer, by default.

Referring to FIG. 13A, the top layer change information 440 may be set to 0 or 1 for each first direction scene number of the first layer, which is the uppermost layer.

When the top layer change information 440 about number 1 of the first direction scene is 0, for number 1 of the first direction scene, all the light emitting devices 30 may determine the priority between the first layer and the second layer, based on the first masking value of the first layer, which is the uppermost layer, as the default value and may perform the first calculation and the second calculation depending on the determination result.

On the other hand, when the top layer change information 440 about number 1 of the first direction scene is 1, unlike the default setting value, for number 1 of the first direction scene, all the light emitting devices 30 may change the second layer to the uppermost layer, may change the first layer to an intermediate layer, may determine the priority between the second layer and the first layer based on the second masking value of the second layer, which is the changed uppermost layer, and may perform first calculation and second calculation depending on the determination result.

Referring to FIG. 13B, the top layer change information 440 may indicate a change value allocated to each classification for each first direction scene number of a first layer that is an uppermost layer.

In this case, condition information stored in the light emitting device 30 may include top layer change classification information. Each of the light emitting devices 30 may identify a change value corresponding to its condition information, may determine the priority depending on the change value, and may perform the first calculation and the second calculation depending on the determination result.

In detail, for number 1 of the first direction scene, the light emitting device 30, which has a change value allocated to the classification, to which it belongs, for number 1 of the first direction scene is 0, may determine the priority between the first layer and the second layer, based on the first masking value of the first layer, which is the uppermost layer, as the default value and may perform the first calculation and the second calculation depending on the determination result.

On the other hand, unlike the default setting value, for number 1 of the first direction scene, the light emitting device 30, which has a change value allocated to the classification, to which it belongs, for number 1 of the first direction scene is 0, may change the second layer to the uppermost layer, may change the first layer to an intermediate layer, may determine the priority between the second layer and the first layer based on the second masking value of the second layer, which is the changed uppermost layer, and may perform the first calculation and the second calculation depending on the determination result.

As described above, when the first layer is the uppermost layer depending on the default setting value, it is described that the first direction scene number of the first layer, which is the uppermost layer includes the top layer change information. However, when the second layer is set as the uppermost layer by default, the second direction scene number of the second layer, which is the uppermost layer, may include the top layer change information.

However, it is described with reference to FIGS. 14 to 20 that each of the light emitting devices 30 determines its final emission color, by distinguishing between a case where the top layer change information 440 is applied equally to all the light emitting devices 30, and a case where the top layer change information 440 is individually applied depending on the classification to which each of the light emitting devices 30 belongs.

For convenience of description, it is described that there are four light emitting devices, with reference to FIGS. 14 to 20. However, actually, it may be applied collectively to tens of thousands of light emitting devices in a performance hall.

When the control console device 10 generates a data packet for the specific performance direction section and transmits the data packet to the four light emitting devices 30, the four light emitting devices 30 may identify values (for light emission) corresponding to their condition information by comparing the received data packet with their condition information.

Referring to FIG. 14, for the first direction scene number 1 of the light emitting device A, it may be identified that the first emission color value is "red", the first masking value is 0, and the first transparency value is 25%. For the second direction scene number 4 of the light emitting device A, it may be identified that the second emission color value "sky blue", the second masking value is 1, and the second transparency value is 10%.

For the first direction scene number 1 of the light emitting device B, it may be identified that the first emission color value is "yellow", the first masking value is 0, and the first transparency value is 15%. For the second direction scene number 4 of the light emitting device B, it may be identified that the second emission color value "blue", the second masking value is 0, and the second transparency value is 15%.

For the first direction scene number 1 of the light emitting device C, it may be identified that the first emission color value is "yellow", the first masking value is 1, and the first transparency value is 50%. For the second direction scene number 4 of the light emitting device C, it may be identified that the second emission color value "green", the second masking value is 0, and the second transparency value is 30%.

For the first direction scene number 1 of the light emitting device D, it may be identified that the first emission color value is "red", the first masking value is 0, and the first transparency value is 70%. For the second direction scene number 4 of the light emitting device D, it may be identified that the second emission color value "violet", the second masking value is 0, and the second transparency value is 15%.

In FIG. 14, for convenience of description, it is described that the emission color values correspond to "red", "yellow", "sky blue", "blue", "green" and "violet". However, the corresponding values may be expressed as color values based on RGB or the like. For example, "red" may be expressed as (255, 0, 0).

First of all, as shown in FIG. 13A, when the top layer change information 440 is applied equally to all the light emitting devices 30, in the case where a change value is 0, for number 1 of the first direction scene, four light emitting devices may determine the priority between the first layer and the second layer, based on the first masking value of the first layer, which is the uppermost layer, as the default value and may perform the first calculation and the second calculation depending on the determination result.

In detail, referring to FIG. 15A, as described above, because the first masking value of light emitting device A is 0, it may be determined that the first layer 510, which is an uppermost layer, has priority over the second layer 520, which is an intermediate layer. Accordingly, the first calculation may be performed between the second layer 520 and the third layer 530. The second calculation may be performed between the first calculation result and the first layer 510.

The first calculation may apply the second transparency value of 10% to the second emission color value (sky blue) of the second layer 520 and then may perform alpha blending of the second emission color value and the background color value (black) of the third layer 530. The second calculation may apply the first transparency value of 25% to the first emission color value (red) of the first layer 510 and then may perform alpha blending of the first emission color value and the first calculation result. Accordingly, as shown in FIG. 16, the light emitting device A may emit light with a final emission color 911 corresponding to the second calculation result.

In detail, referring to FIG. 15B, as described above, because the first masking value of light emitting device B is 0, it may be determined that the first layer 610, which is an uppermost layer, has priority over the second layer 620, which is an intermediate layer. Accordingly, the first calculation may be performed between the second layer 620 and the third layer 630. The second calculation may be performed between the first calculation result and the first layer 610.

The first calculation may apply the second transparency value of 15% to the second emission color value (blue) of the second layer 620 and then may perform alpha blending of the second emission color value and the background color value (black) of the third layer 630. The second calculation may apply the first transparency value of 15% to the first emission color value (yellow) of the first layer 610 and then may perform alpha blending of the first emission color value and the first calculation result. Accordingly, as shown in FIG. 16, the light emitting device B may emit light with a final emission color 912 corresponding to the second calculation result.

In detail, referring to FIG. 15C, as described above, because the first masking value of light emitting device C is 1, it may be determined that the first layer 710, which is an uppermost layer, does not have priority over the second layer 720, which is an intermediate layer. Accordingly, the first calculation may be performed between the first layer 710 and the third layer 730. The second calculation may be performed between the first calculation result and the second layer 720.

The first calculation may apply the first transparency value of 50% to the first emission color value (yellow) of the first layer 710 and then may perform alpha blending of the first emission color value and the background color value (black) of the third layer 730. The second calculation may apply the second transparency value of 30% to the second emission color value (green) of the second layer 720 and then may perform alpha blending of the second emission color value and the first calculation result. Accordingly, as shown in FIG. 16, the light emitting device C may emit light with a final emission color 913 corresponding to the second calculation result.

In detail, referring to FIG. 15D, as described above, because the first masking value of light emitting device D is 0, it may be determined that the first layer 810, which is an uppermost layer, has priority over the second layer 820, which is an intermediate layer. Accordingly, the first calculation may be performed between the second layer 820 and the third layer 830. The second calculation may be performed between the first calculation result and the first layer 810.

The first calculation may apply the second transparency value of 15% to the second emission color value (violet) of the second layer 820 and then may perform alpha blending of the second emission color value and the background color value (black) of the third layer 830. The second calculation may apply the first transparency value of 70% to the first emission color value (red) of the first layer 810 and then may perform alpha blending of the first emission color value and the first calculation result. Accordingly, as shown in FIG. 16, the light emitting device D may emit light with a final emission color 914 corresponding to the second calculation result.

Next, as shown in FIG. 13A, when the top layer change information 440 is applied equally to all the light emitting devices 30, in the case where a change value is 1, unlike the default setting value, four light emitting device may change the second layer to the uppermost layer, may change the first layer to an intermediate layer, may determine the priority between the second layer and the first layer, based on the second masking value of the second layer being the uppermost layer, and may perform the first calculation and the second calculation depending on the determination result.

In detail, referring to FIG. 17A, as described above, because the second masking value of light emitting device A is 1, it may be determined that second first layer 520, which is an uppermost layer, does not have priority over the first layer 510, which is an intermediate layer. Accordingly, the first calculation may be performed between the second layer 520 and the third layer 530. The second calculation may be performed between the first calculation result and the first layer 510.

The first calculation may apply the second transparency value of 10% to the second emission color value (sky blue) of the second layer 520 and then may perform alpha blending of the second emission color value and the background color value (black) of the third layer 530. The second calculation may apply the first transparency value of 25% to the first emission color value (red) of the first layer 510 and then may perform alpha blending of the first emission color value and the first calculation result. Accordingly, as shown in FIG. 18, the light emitting device A may emit light with a final emission color 921 corresponding to the second calculation result.

In detail, referring to FIG. 17B, as described above, because the second masking value of light emitting device B is 0, it may be determined that the second layer 620, which is an uppermost layer, has priority over the first layer 610, which is an intermediate layer. Accordingly, the first calculation may be performed between the first layer 610 and the third layer 630. The second calculation may be performed between the first calculation result and the second layer 620.

The first calculation may apply the first transparency value of 15% to the first emission color value (yellow) of the first layer 610 and then may perform alpha blending of the first emission color value and the background color value (black) of the third layer 630. The second calculation may apply the second transparency value of 15% to the second emission color value (blue) of the second layer 620 and then may perform alpha blending of the second emission color value and the first calculation result. Accordingly, as shown in FIG. 18, the light emitting device B may emit light with a final emission color 922 corresponding to the second calculation result.

In detail, referring to FIG. 17C, as described above, because the second masking value of light emitting device C is 0, it may be determined that the second layer 720, which is an uppermost layer, has priority over the first layer 710, which is an intermediate layer. Accordingly, the first calculation may be performed between the first layer 710 and the third layer 730. The second calculation may be performed between the first calculation result and the second layer 720.

The first calculation may apply the first transparency value of 50% to the first emission color value (yellow) of the first layer 710 and then may perform alpha blending of the first emission color value and the background color value (black) of the third layer 730. The second calculation may apply the second transparency value of 30% to the second emission color value (green) of the second layer 720 and then may perform alpha blending of the second emission color value and the first calculation result. Accordingly, as shown in FIG. 18, the light emitting device C may emit light with a final emission color 923 corresponding to the second calculation result.

In detail, referring to FIG. 17D, as described above, because the second masking value of light emitting device D is 0, it may be determined that the second layer 820, which is an uppermost layer, has priority over the first layer 810, which is an intermediate layer. Accordingly, the first calculation may be performed between the first layer 810 and the third layer 830. The second calculation may be performed between the first calculation result and the second layer 820.

The first calculation may apply the first transparency value of 70% to the first emission color value (red) of the first layer 810 and then may perform alpha blending of the first emission color value and the background color value (black) of the third layer 830. The second calculation may apply the second transparency value of 15% to the second emission color value (violet) of the second layer 820 and then may perform alpha blending of the second emission color value and the first calculation result. Accordingly, as shown in FIG. 18, the light emitting device D may emit light with a final emission color 924 corresponding to the second calculation result.

Finally, as shown in FIG. 14, when the top layer change information 440 is applied individually depending on the classification to which each of the light emitting devices 30 belongs, in the case where the change value of each of light emitting device A and light emitting device D is 0 and the change value of each of light emitting device B and light emitting device C is 0, for number 1 of the first direction scene, the light emitting device A and the light emitting device D may determine the priority between the first layer and the second layer, based on the first masking value of the first layer, which is the uppermost layer, as the default value and may perform the first calculation and the second calculation depending on the determination result. On the other hand, unlike the default setting value, for number 1 of the first direction scene, the light emitting device B and the light emitting device C may change the second layer to the uppermost layer, may change the first layer to an intermediate layer, may determine the priority between the second layer and the first layer based on the second masking value of the second layer, which is the uppermost layer, and may perform the first calculation and the second calculation depending on the determination result.

In detail, referring to FIG. 19A, as described above, because the first masking value of light emitting device A is 0, it may be determined that the first layer 510, which is an uppermost layer, has priority over the second layer 520. Accordingly, the first calculation may be performed between the second layer 520 and the third layer 530. The second calculation may be performed between the first calculation result and the first layer 510.

The first calculation may apply the second transparency value of 10% to the second emission color value (sky blue) of the second layer 520 and then may perform alpha blending of the second emission color value and the background color value (black) of the third layer 530. The second calculation may apply the first transparency value of 25% to the first emission color value (red) of the first layer 510 and then may perform alpha blending of the first emission color value and the first calculation result. Accordingly, as shown in FIG. 20, the light emitting device A may emit light with a final emission color 931 corresponding to the second calculation result.

Furthermore, referring to FIG. 19B, as described above, because the second masking value of light emitting device B is 0, it may be determined that the second layer 620, which is an uppermost layer, has priority over the first layer 610, which is an intermediate layer. Accordingly, the first calculation may be performed between the first layer 610 and the third layer 630. The second calculation may be performed between the first calculation result and the second layer 620.

The first calculation may apply the first transparency value of 15% to the first emission color value (yellow) of the first layer 610 and then may perform alpha blending of the first emission color value and the background color value (black) of the third layer 630. The second calculation may apply the second transparency value of 15% to the second emission color value (blue) of the second layer 620 and then may perform alpha blending of the second emission color value and the first calculation result. Accordingly, as shown in FIG. 20, the light emitting device B may emit light with a final emission color 932 corresponding to the second calculation result.

Moreover, referring to FIG. 19C, as described above, because the second masking value of light emitting device C is 0, it may be determined that the second layer 720, which is an uppermost layer, has priority over the first layer 710, which is an intermediate layer. Accordingly, the first calculation may be performed between the first layer 710 and the third layer 730. The second calculation may be performed between the first calculation result and the second layer 720.

The first calculation may apply the first transparency value of 50% to the first emission color value (yellow) of the first layer 710 and then may perform alpha blending of the first emission color value and the background color value (black) of the third layer 730. The second calculation may apply the second transparency value of 30% to the second emission color value (green) of the second layer 720 and then may perform alpha blending of the second emission color value and the first calculation result. Accordingly, as shown in FIG. 20, the light emitting device C may emit light with a final emission color 933 corresponding to the second calculation result.

Besides, referring to FIG. 19D, as described above, because the first masking value of light emitting device D is 0, it may be determined that the first layer 810, which is an uppermost layer, has priority over the second layer 820, which is an intermediate layer. Accordingly, the first calculation may be performed between the second layer 820 and the third layer 830. The second calculation may be performed between the first calculation result and the first layer 810.

The first calculation may apply the second transparency value of 15% to the second emission color value (violet) of the second layer 820 and then may perform alpha blending of the second emission color value and the background color value (black) of the third layer 830. The second calculation may apply the first transparency value of 70% to the first emission color value (red) of the first layer 810 and then may perform alpha blending of the first emission color value and the first calculation result. Accordingly, as shown in FIG. 20, the light emitting device D may emit light with a final emission color 934 corresponding to the second calculation result.

As described above, it is described that the top layer change information is collectively applied to all light emitting devices or is individually applied to each of the light emitting devices for the respective number of the first direction scene for the first layer being the uppermost layer and thus each of the light emitting devices performs alpha blending and emits light with the final emission color when it is assumed that the first layer is the uppermost layer, the second layer is the intermediate layer, and the third layer is the lowermost layer, as the default setting order.

Likewise, the top layer change information is collectively applied to all light emitting devices or is individually applied to each of the light emitting devices for the respective number of the second direction scene for the second layer being the uppermost layer and thus each of the light emitting devices performs alpha blending and emits light with the final emission color when it is assumed that the second layer is the uppermost layer, the first layer is the intermediate layer, and the third layer is the lowermost layer, as the default setting order.

According to an embodiment of the inventive concept, the color finally emitted by each of the light emitting device 30 may be expressed in various methods in various cases such as a default setting value (collective or individual application), a top layer change value, the number of layers, each layer-specific masking value, a transparency value, and the like. Accordingly, when a performance scene is directed by using all the light emitting devices 30 present in a performance hall, more delicate and diverse scenes may be directed.

As described above, it is described that only the priority of uppermost layer and intermediate layer is determined by using a masking value of a layer being the uppermost layer and the first calculation and the second calculation are sequentially performed depending on the priority determination result. However, according to an embodiment of the inventive concept, the priority is determined by using all of the masking value of the uppermost layer and the masking value of the intermediate layer and then calculation may be performed.

Hereinafter, a method of determining the priority by using all of the masking value of the uppermost layer and the masking value of the intermediate layer and performing a calculation will be described in detail assuming that the first layer is the uppermost layer, the second layer is the intermediate layer, and the third layer is the lowermost layer, by default.

The first processor 130 of the control console device 10 may generate a data packet including direction information for each of a plurality of layers and may transmit the data packet through the first communication unit 110 (S110). Because step S110 is the same as described above, a detailed description thereof will be omitted.

The second processor 340 of the plurality of light emitting devices 30 may receive the data packet 400 from the control console device 10 through the second communication unit 310 and may allow the light emitting unit 330 to emit light based on the direction information included in the data packet 400 (S120).

Hereinafter, when step S120 is described, a detailed description of content the same as that described above will be omitted to avoid redundancy.

Each of the plurality of light emitting devices 30 may perform a first calculation based on the second masking value of the second layer. Afterward, each of the plurality of light emitting devices 30 may perform a second calculation based on the first calculation result and the first masking value of the first layer and may emit light in the final emission color based on the second calculation result.

When performing the first calculation, each of the plurality of light emitting devices 30 may determine the priority of the second layer and the third layer based on the second masking value and may determine whether to perform alpha blending using the second transparency value depending on the priority determination result.

In detail, when the priority determination result indicates that the second layer has priority over the third layer (when the second layer masks the third layer), each of the plurality of light emitting devices 30 may apply the second transparency value to the second emission color value and may perform alpha blending of the second transparency value and a background color value (black).

On the other hand, when the priority determination result indicates that the second layer does not have priority over the third layer (when the second layer does not mask the third layer), each of the plurality of light emitting devices 30 may not perform alpha blending by using the second transparency value.

Afterward, when performing the second calculation, each of the plurality of light emitting devices 30 may determine the priority of the first layer and the first calculation result based on the first masking value and may determine whether to perform alpha blending using the first transparency value depending on the priority determination result. At this time, the first calculation result may be a second layer from applying a color value obtained by performing alpha blending of a background color value and the second emission color value from applying the second transparency value. Alternatively, the first calculation result may be a second layer from applying the second emission color value, which is not alpha-blended, as it is. Alternatively, the first calculation result may be a color value obtained by performing alpha blending of a background color value and the second emission color value from applying the second transparency value. Alternatively, the first calculation result may be the second emission color value, which is not alpha-blended.

In detail, when the priority determination result indicates that the first layer has priority over the calculation result (when the first layer masks the calculation result), each of the plurality of light emitting devices 30 may apply the first transparency value to the first emission color value and may perform alpha blending of the first transparency value and the calculation result.

On the other hand, when the priority determination result indicates that the first layer does not have priority over the calculation result (when the first layer does not mask the calculation result), each of the plurality of light emitting devices 30 may not perform alpha blending by using the first transparency value.

Each of the plurality of light emitting devices 30 may emit light with a color corresponding to the second calculation result in various cases.

As such, each of the plurality of light emitting devices 30 may determine two priorities by using two masking values and may or may not perform alpha blending depending on each determination result, thereby emitting light in a wider variety of colors.

Various embodiments according to an embodiment of the inventive concept may be implemented as software including one or more instructions stored in a storage medium (e.g., a memory) readable by a machine. For example, a processor (e.g., the processor 130 or 340) of the machine may call at least one instruction among the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily. For example, the 'non-transitory storage medium' may include a buffer in which data is temporarily stored.

According to an embodiment, a method according to various embodiments disclosed in the specification may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product (e.g., a downloadable app) may be at least temporarily stored in the machine-readable storage medium such as the memory of a manufacturer's server, an application store's server, or a relay server or may be generated temporarily. Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to an embodiment of the inventive concept, when a performance is directed in a performance hall, the emission state of the light emitting device may be changed in real time, by transmitting data packets from the control console device to the light emitting device in real time, thereby easily providing various direction scenes depending on situations.

Moreover, the color finally emitted by each light emitting device may be expressed in more diverse ways by performing an operation between the emission color values of each layer by using a plurality of layers, when a directing scene is provided.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A performance directing system by using a plurality of layers, the system comprising:
    a control console device configured to generate and transmit a data packet including direction information for each of the plurality of layers; and
    a plurality of light emitting devices, each of which receives the data packet from the control console device and each of which emits light based on the direction information included in the data packet,
    wherein the plurality of layers include a first layer being an uppermost layer, a second layer being an intermediate layer, and a third layer being a lowermost layer,
    wherein each of the plurality of light emitting devices is configured to:
    determine a priority between the first layer being the uppermost layer and the second layer being the intermediate layer based on direction information of the first layer;
    perform a calculation for determining an emission color by using at least one of the direction information of the first layer, direction information of the second layer, and direction information of the third layer depending on the priority determination; and
    emit the light based on the calculated result,
    wherein the direction information of the first layer includes at least one of number information corresponding to a first direction scene, emission color information, first masking information, and first transparency information,
    wherein the direction information of the second layer includes at least one of number information corresponding to a second direction scene, second masking information, and second transparency information, and
    wherein the direction information of the third layer includes background color information.

2. The system of claim 1, wherein each of the plurality of light emitting devices is configured to:
    when the first layer being the uppermost layer has priority over the second layer being the intermediate layer depending on the priority determination, perform a first calculation by using the direction information of the second layer and the direction information of the third layer and perform a second calculation by using the first calculated result and the direction information of the first layer, and emit light based on the second calculated result; and
    when the second layer being the intermediate layer has priority over the first layer being the uppermost layer depending on the priority determination, perform the first calculation by using the direction information of the first layer and the direction information of the third layer, perform the second calculation by using the first calculated result and the direction information of the second layer, and emit light based on the second calculated result.

3. The system of claim 1, wherein condition information different from each other is stored in each of the plurality of light emitting devices, and
    wherein each of the plurality of light emitting devices is configured to:
    identify a first emission color value, a first masking value, and a first transparency value at the first direction scene corresponding to the condition information by using the direction information of the first layer;
    identify a second emission color value, a second masking value, and a second transparency value at the second direction scene corresponding to the condition information by using the direction information of the second layer; and
    identify a background color value by using the direction information of the third layer.

4. The system of claim 3, wherein each of the plurality of light emitting devices is configured to:
    determine the priority based on the first masking value;
    when the first layer being the uppermost layer has priority over the second layer being the intermediate layer depending on the priority determination,
    when performing the first calculation, perform alpha blending of the second emission color value and the background color value based on the second transparency information; and
    when performing the second calculation, perform alpha blending of the first calculated result and the first emission color value based on the first transparency information.

5. The system of claim 3, wherein each of the plurality of light emitting devices is configured to:
    determine the priority based on the first masking value;
    when the second layer being the intermediate layer has priority over the first layer being the uppermost layer depending on the priority determination,
    when performing the first calculation, perform alpha blending of the first emission color value and the background color value based on the first transparency information; and
    when performing the second calculation, perform alpha blending of the first calculated result and the second emission color value based on the second transparency information.

6. The system of claim 3, wherein the data packet further includes top layer change information, and
    wherein each of the plurality of light emitting devices is configured to:
    depending on the top layer change information, change the second layer to an uppermost layer and change the first layer to an intermediate layer; and
    determine a priority between the second layer being the uppermost layer and the first layer being the intermediate layer based on the second masking value.

7. The system of claim 3, wherein the condition information is information transmitted through an application installed on a smart device possessed by a user, and
    wherein the application maps the condition information based on seat information included in purchase information of a ticket transmitted to the smart device of the user and provides the mapped result to the light emitting devices.

8. A performance directing method by using a plurality of layers and by using a control console device and a plurality of light emitting devices, the method comprising:
    generating and transmitting, by the control console device, a data packet including direction information for each of the plurality of layers; and
    receiving, by each of a plurality of light emitting devices, the data packet from the control console device and emitting light based on the direction information included in the data packet, wherein the plurality of layers include a first layer being an uppermost layer, a second layer being an intermediate layer, and a third layer being a lowermost layer,
wherein the emitting of the light includes:
  determining a priority between the first layer being the uppermost layer and the second layer being the intermediate layer based on direction information of the first layer;
  performing a calculation for determining an emission color by using at least one of the direction information of the first layer, direction information of the second layer, and direction information of the third layer depending on the priority determination; and
  emitting the light based on the calculated result,
wherein the direction information of the first layer includes at least one of number information corresponding to a first direction scene, emission color information, first masking information, and first transparency information,
wherein the direction information of the second layer includes at least one of number information corresponding to a second direction scene, second masking information, and second transparency information, and
wherein the direction information of the third layer includes background color information.

9. The method of claim 8, wherein each of the plurality of light emitting devices is configured to:
  when the first layer being the uppermost layer has priority over the second layer being the intermediate layer depending on the priority determination, perform a first calculation by using the direction information of the second layer and the direction information of the third layer, perform a second calculation by using the first calculated result and the direction information of the first layer, and emit light based on the second calculated result; and
  when the second layer being the intermediate layer has priority over the first layer being the uppermost layer depending on the priority determination, perform the first calculation by using the direction information of the first layer and the direction information of the third layer, perform the second calculation by using the first calculated result and the direction information of the second layer, and emit light based on the second calculated result.

10. The method of claim 8, wherein condition information different from each other is stored in each of the plurality of light emitting devices, and
  wherein each of the plurality of light emitting devices is configured to:
  identify a first emission color value, a first masking value, and a first transparency value at the first direction scene corresponding to the condition information by using the direction information of the first layer;
  identify a second emission color value, a second masking value, and a second transparency value at the second direction scene corresponding to the condition information by using the direction information of the second layer; and
  identify a background color value by using the direction information of the third layer.

11. The method of claim 10, wherein each of the plurality of light emitting devices is configured to:
  determine the priority based on the first masking value;
  when the first layer being the uppermost layer has priority over the second layer being the intermediate layer depending on the priority determination,
  when performing the first calculation, perform alpha blending of the second emission color value and the background color value based on the second transparency information; and
  when performing the second calculation, perform alpha blending of the first calculated result and the first emission color value based on the first transparency information.

12. The method of claim 10, wherein each of the plurality of light emitting devices is configured to:
  determine the priority based on the first masking value;
  when the second layer being the intermediate layer has priority over the first layer being the uppermost layer depending on the priority determination,
  when performing the first calculation, perform alpha blending of the first emission color value and the background color value based on the first transparency information; and
  when performing the second calculation, perform alpha blending of the first calculated result and the second emission color value based on the second transparency information.

13. The method of claim 10, wherein the data packet further includes top layer change information, and
  wherein each of the plurality of light emitting devices is configured to:
  depending on the top layer change information, change the second layer to an uppermost layer and change the first layer to an intermediate layer; and
  determine a priority between the second layer being the uppermost layer and the first layer being the intermediate layer based on the second masking value.

14. The method of claim 10, wherein the condition information is information transmitted through an application installed on a smart device possessed by a user, and
  wherein the application maps the condition information based on seat information included in purchase information of a ticket transmitted to the smart device of the user and provides the mapped result to the light emitting devices.

15. A light emitting device for performance direction, the light emitting device comprising:
  a communication unit configured to communicate with a control console device;
  a light emitting unit configured to emit light by using a light source element;
  a memory configured to store data; and
  a processor configured to control an operation of the light emitting device,
  wherein the processor is configured to:
  perform a calculation for determining an emission color by using direction information about each of a plurality of layers included in a data packet received from the control console device through the communication unit, based on condition information stored in the memory; and
  control emission based on the calculated result,
wherein the plurality of layers include a first layer being an uppermost layer, a second layer being an intermediate layer, and a third layer being a lowermost layer,
wherein the direction information of the first layer includes at least one of number information corresponding to a first direction scene, emission color information, first masking information, and first transparency information,
wherein the direction information of the second layer includes at least one of number information corresponding to a second direction scene, second masking information, and second transparency information, and wherein the direction information of the third layer includes background color information.

16. The light emitting device of claim 15, wherein the condition information is information transmitted through an application installed on a smart device possessed by a user, and wherein the application maps the condition information based on seat information included in purchase information of a ticket transmitted to the smart device of the user and provides the mapped result to the light emitting device.

\* \* \* \* \*